United States Patent
Wang et al.

(10) Patent No.: US 12,439,094 B2
(45) Date of Patent: Oct. 7, 2025

(54) PRE-ANALYSIS BASED IMAGE COMPRESSION METHODS

(71) Applicant: Alibaba Damo (Hangzhou) Technology Co., Ltd., Zhejiang (CN)

(72) Inventors: Shurun Wang, Beijing (CN); Zhao Wang, Hangzhou (CN); Yan Ye, San Diego, CA (US); Shiqi Wang, Hong Kong (HK)

(73) Assignee: Alibaba Damo (Hangzhou) Technology Co., Ltd., Hangzhou (CN)

( * ) Notice: Subject to any disclaimer, the term of this patent is extended or adjusted under 35 U.S.C. 154(b) by 150 days.

(21) Appl. No.: 18/478,680

(22) Filed: Sep. 29, 2023

(65) Prior Publication Data

US 2024/0121445 A1    Apr. 11, 2024

Related U.S. Application Data

(60) Provisional application No. 63/378,888, filed on Oct. 10, 2022.

(51) Int. Cl.
| | |
|---|---|
| *H04N 7/12* | (2006.01) |
| *H04N 19/119* | (2014.01) |
| *H04N 19/14* | (2014.01) |
| *H04N 19/172* | (2014.01) |
| *H04N 19/176* | (2014.01) |
| *H04N 19/42* | (2014.01) |
| *H04N 19/85* | (2014.01) |
| *H04N 19/124* | (2014.01) |

(52) U.S. Cl.
CPC ........... *H04N 19/85* (2014.11); *H04N 19/119* (2014.11); *H04N 19/14* (2014.11); *H04N 19/172* (2014.11); *H04N 19/176* (2014.11); *H04N 19/42* (2014.11); *H04N 19/124* (2014.11)

(58) Field of Classification Search
CPC ...................................................... H04N 19/14
See application file for complete search history.

(56) References Cited

FOREIGN PATENT DOCUMENTS

| | | |
|---|---|---|
| CN | 103002289 A | 3/2013 |
| CN | 109409371 A | 3/2019 |
| WO | 2021097595 A1 | 5/2021 |
| WO | 2022127865 A1 | 6/2022 |

OTHER PUBLICATIONS

Adini et al., "Context-enabled learning in the human visual system," Nature, vol. 415, 2002, pp. 790-793.
(Continued)

*Primary Examiner* — Y Lee
(74) *Attorney, Agent, or Firm* — Finnegan, Henderson, Farabow, Garrett & Dunner, LLP

(57) ABSTRACT

The present disclosure provides pre-analysis based methods for adaptively compressing image data consumed by machine vision tasks. An exemplary method includes: receiving a video sequence; encoding one or more input pictures associated with the video sequence; and generating a bitstream, wherein the encoding includes: performing instance segmentation of an input picture, to generate one or more segment masks; combining the one or more segment masks to generate a merged mask; extracting, from the input picture, a region comprising the merged mask; and compressing image data representing the extracted region.

18 Claims, 18 Drawing Sheets

(56) References Cited

OTHER PUBLICATIONS

An et al., "Block partitioning structure for next generation video coding," International Telecommunications Union, 2015, 8 pages.
Balle, et al., "Variational Image Compression with a Scale Hyperprior," International Conference on Learning Representations, 2018, 23 pages.
Balle et al., End-to-End Optimized Image Compression, ICLR, 2017, 27 pages.
Bross et al., Developments in International Video Coding Standardization After AVC, With an Overview of Versatile Video Coding (VVC), Proceedings of the IEEE, vol. 109, No. 9, Sep. 2021, pp. 1463-1493.
Brouard, Olivier, "Pre-analysis of video for its advanced coding. Application to the HDTV coding in H.264 streams," Université de Nantes, 48 pages, 2010.
Chao, et al., "A Novel Rate Control Framework for SIFT/SURF Feature Preservation in H.264/AVC Video Compression," IEEE Transactions on Circuits and Systems for Video Technology, vol. 25, No. 6, Jun. 2015, pp. 958-972.
Duan et al, "Overview of the MPEG-CDVS Standard," IEEE Transactions on Image Processing, vol. 25, No. 1, Jan. 2016, pp. 179-194.
Duan et al., Compact Descriptors for Video Analysis: The Emerging MPEG Standard, IEEE Computer Society, 2018, pp. 44-54.
Duan et al., "Video Coding for Machines: A Paradigm of Collaborative Compression and Intelligent Analytics," IEEE Transactions on Image Processing, vol. 29, 2020, pp. 8680-8695.
Garcia-Lucas et al., "Acceleration of the integer motion estimation in JEM through pre-analysis techniques," J. Supercomput, 75:1203-1214, 2019.
Li et al., "$\lambda$ Domain Rate Control Algorithm for High Efficiency Video Coding," IEEE Transactions on Image Processing, vol. 23, No. 9, Sep. 2014, pp. 3841-3854.
Liu et al., "CNN-Basesd DCT-Like Transform for Image Compression," Springer, 2018, pp. 61-72.
Minnen et al., "Joint Autoregressive and Hierarchical Priors for Learned Image Compression," $32^{nd}$ Conference on Neural Information Processing System, 2018, 10 pages.
Mohan et al., "Internet of Video Things in 2030: A World with Many Cameras," IEEE Xplore, 2017, 4 pages.
Pfaff et al., "CE3: Affine linear weighted intra prediction (CE3-4.1, CE3-4.2)," JVET-N0217, $14^{th}$ Meeting: Geneva, CH, Mar. 19-27, 2019, 17 pages.
Rabbani et al., "JPEG2000: Image compression fundamentals, standards and practice," Journal of Electronic Imaging, 2002, 11(2): 286.
Sullivan et al., "Overview of the High Efficiency Video Coding (HEVC) Standard," IEE Transactions on Circuits and Systems for Video Technology, vol. 22, No. 12, pp. 1649-1668 (2012).
Toderici et al., "Variable Rate Image Compression with Recurrent Neural Networks," ICLR, 2016, 12 pages.
Wallace et al., "The JPEG Still Picture Compression Standard," IEEE Transactions on Consumer Electronics, vol. 38, No. 1, Feb. 1992, 17 pages.
Wang et al., "Attention-Based Dual-Scale CNN In-Loop Filter for Versatile Video Coding," IEEE Access, vol. 7, 145214-145226, 2019.
Yokoyama et al., "A Rate Control Method With Pre-Analysis For Real-Time MPEG-2 Video Coding," 2001 International Conference on Image Processing, IEEE, pp. 514-517, 2001.
Zhao et al., "Mode-dependent non-separable secondary transform," ITU-T SG16/Q6 Doc. COM16-C1044, 5 pages, 2015.
PCT International Search Report and Written Opinion mailed Jan. 13, 2024, issued in corresponding International Application No. PCT/CN2023/123861 (7 pgs.).

Input picture

Direct pre-process operation

Block based pre-process operation

Dilate based pre-process operation

Dilate and block based pre-process operation

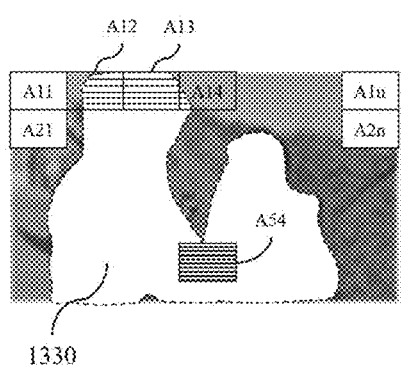
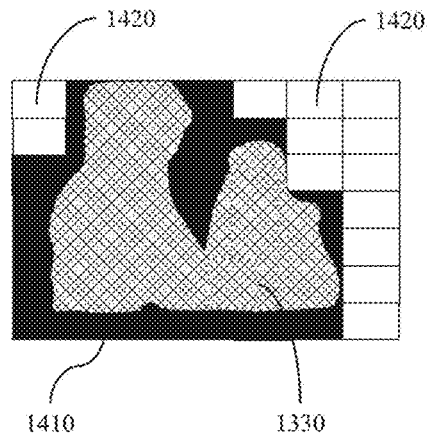
FIG. 14A　　　　FIG. 14B
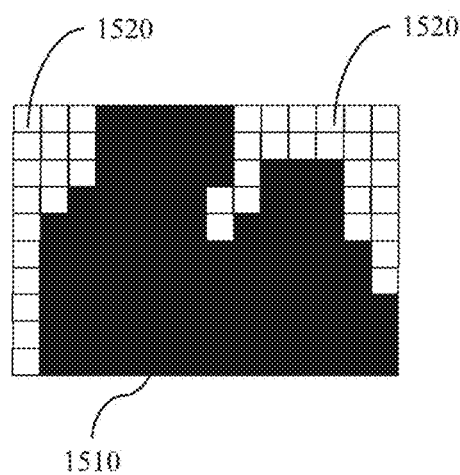
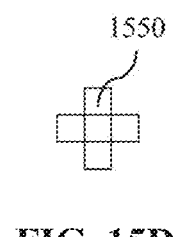
FIG. 15A
FIG. 15B　　　　FIG. 15C
FIG. 15D

PRE-ANALYSIS BASED IMAGE COMPRESSION METHODS

CROSS-REFERENCE TO RELATED APPLICATIONS

The disclosure claims the benefits of priority to U.S. Provisional Application No. 63/378,888, filed on Oct. 10, 2022, which is incorporated herein by reference in its entirety.

TECHNICAL FIELD

The present disclosure generally relates to video processing, and more particularly, to methods and apparatuses for performing pre-analysis based image/video compression for machine vision tasks.

BACKGROUND

With the rise of machine learning technologies and machine vision applications, the amount of videos and images (collectively referred to as "image data") consumed by machines has been rapidly growing. Typical use cases include autonomous driving, intelligent transportation, smart city, intelligent content management, etc., which incorporate machine vision tasks such as object detection, instance segmentation, and object tracking.

Due to the large volume of image data required by machine vision tasks, it is essential to compress the image data for efficient transmission and storage. However, conventional image/video compression techniques have been focusing on ensuring the image/video quality as perceived by humans, yet machines consume and understand visual data differently to human vision. As a result, the image/video compression techniques suitable for machine vision could be different from the conventional one. New compression techniques are therefore needed to achieve optimized performance for machine usage.

SUMMARY OF THE DISCLOSURE

The present disclosure provides pre-analysis based methods for adaptively compressing image data consumed by machine vision tasks. In some embodiments, an exemplary image data processing method includes: receiving a video sequence; encoding one or more input pictures associated with the video sequence; and generating a bitstream, wherein the encoding includes: performing instance segmentation of an input picture, to generate one or more segment masks; combining the one or more segment masks to generate a merged mask; extracting, from the input picture, a region comprising the merged mask; and compressing image data representing the extracted region.

In some embodiments, a non-transitory computer readable storage medium stores a bitstream generated by a method including: performing instance segmentation of an input picture, to generate one or more segment masks; combining the one or more segment masks to generate a merged mask; extracting, from the input picture, a region comprising the merged mask; and compressing image data representing the extracted region, to generate the bitstream.

In some embodiments, an image data processing apparatus includes: a memory storing a set of instructions; and one or more processors configured to execute the set of instructions to cause the apparatus to perform operations comprising: performing instance segmentation of an input picture, to generate one or more segment masks; combining the one or more segment masks to generate a merged mask; extracting, from the input picture, a region comprising the merged mask; and compressing image data representing the extracted region.

In some embodiments, a non-transitory computer readable storage medium stores a set of instructions that, when executed by a computer, causes the computer to perform a method including: performing instance segmentation of an input picture, to generate one or more segment masks; combining the one or more segment masks to generate a merged mask; extracting, from the input picture, a region comprising the merged mask; and compressing image data representing the extracted region, to generate the bitstream.

In some embodiments, an image data processing method includes: receiving a bitstream; and decoding, using coded information of the bitstream, one or more pictures, wherein the decoding includes: receiving a bitstream comprising compressed image data with regional information, wherein the regional information indicates the region where the compressed image data represents in a picture; and reconstructing the picture by decoding the compressed image data according to the regional information.

In some embodiments, a non-transitory computer readable storage medium stores a bitstream comprising compressed image data with regional information, wherein the regional information indicates the region where the compressed image data represents in a picture, and the bitstream is processed by a method including: reconstructing the picture by decoding the compressed image data according to the regional information.

In some embodiments, an image data processing apparatus includes: a memory storing a set of instructions; and one or more processors configured to execute the set of instructions to cause the apparatus to perform operations comprising: receiving a bitstream comprising compressed image data with regional information, wherein the regional information indicates the region where the compressed image data represents in a picture; and reconstructing the picture by decoding the compressed image data according to the regional information.

In some embodiments, a non-transitory computer readable storage medium stores a set of instructions that, when executed by a computer, causes the computer to perform a method including: receiving a bitstream comprising compressed image data with regional information, wherein the regional information indicates the region where the compressed image data represents in a picture; and reconstructing the picture by decoding the compressed image data according to the regional information.

BRIEF DESCRIPTION OF THE DRAWINGS

Embodiments and various aspects of the present disclosure are illustrated in the following detailed description and the accompanying figures. Various features shown in the figures are not drawn to scale.

FIG. 14A and FIG. 14B schematically illustrates pre-processing an input picture based on a block based pre-processing, according to some embodiments of the present disclosure.

FIG. 15A, FIG. 15B, FIG. 15C, and FIG. 15D schematically illustrates pre-processing an input picture based on a dilation based pre-processing, according to some embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The present disclosure is directed to Video Coding for Machines (VCM), which aims at compressing input videos and images or feature maps for machine vision tasks. Specifically, according to exemplary embodiments, prior to encoding, an input picture is pre-analyzed to detect segment masks that correspond to objects or foregrounds in the input picture. The segment masks are further pre-processed to form a merged mask, which is then encoded (i.e., compressed). In some embodiments, the pre-processing may also identify an extended region surrounding the merged mask. The extended region is also compressed by the encoder.

Consistent with the disclosed embodiment, the pre-analysis and pre-processing may be performed by an image data pre-processor separate from the encoder. Alternatively, the pre-analysis may be performed by the encoder itself. The present disclosure does not limit the hardware or software architecture for implementing the image data pre-analysis.

The disclosed techniques are suitable for compressing image data used by any machine vision tasks, such as object recognition and tracking, face recognition, image/video search, mobile augmented reality (MAR), autonomous vehicles, Internet of Things (IoT), images matching, 3-dimension structure construction, stereo correspondence, motion tracking, etc.

Figure 1:
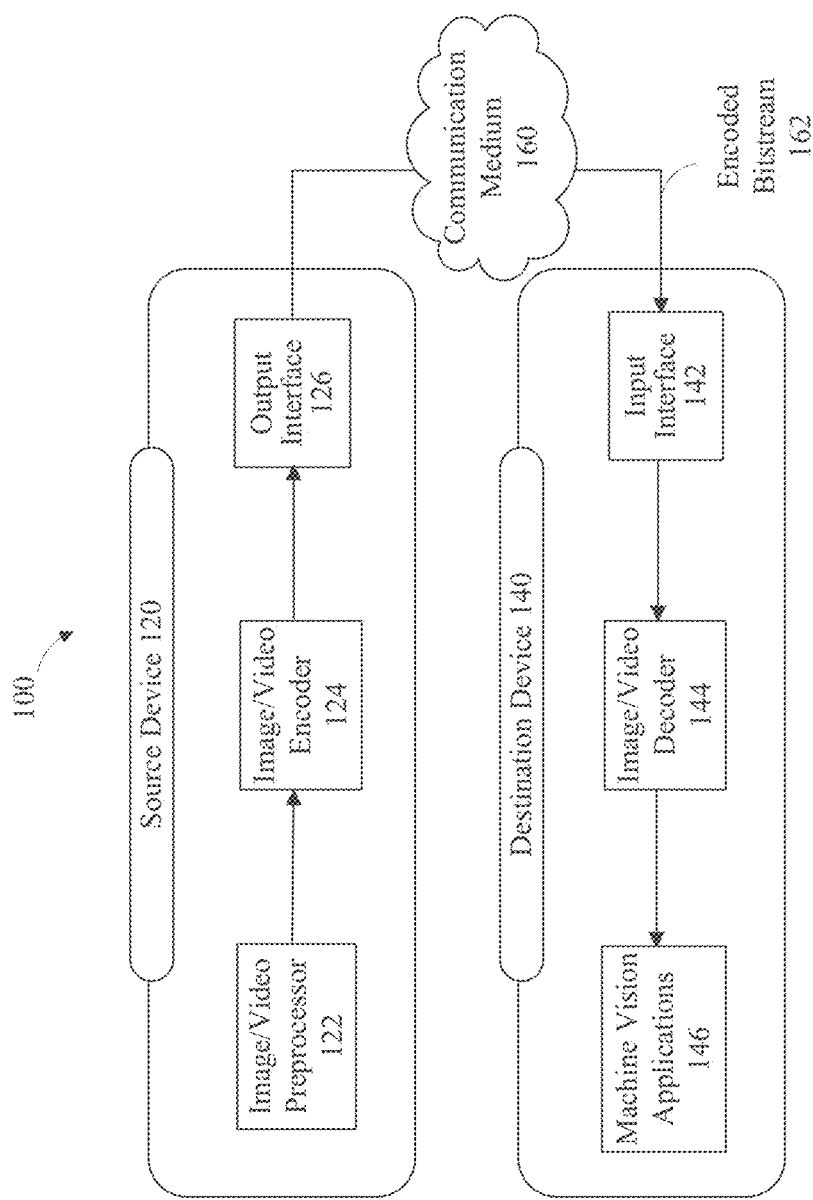
FIG. 1 is a schematic diagram illustrating an exemplary system for preprocessing and coding image data, according to some embodiments of the present disclosure.

FIG. 1 is a block diagram illustrating a system 100 for preprocessing and coding image data, according to some disclosed embodiments. The image data may include an image (also called a "picture" or "frame"), multiple images, or a video. An image is a static picture. Multiple images may be related or unrelated, either spatially or temporary. A video is a set of images arranged in a temporal sequence.

As shown in FIG. 1, system 100 includes a source device 120 that provides encoded video data to be decoded at a later time by a destination device 140. Consistent with the disclosed embodiments, each of source device 120 and destination device 140 may include any of a wide range of devices, including a desktop computer, a notebook (e.g., laptop) computer, a server, a tablet computer, a set-top box, a mobile phone, a vehicle, a camera, an image sensor, a robot, a television, a camera, a wearable device (e.g., a smart watch or a wearable camera), a display device, a digital media player, a video gaming console, a video streaming device, or the like. Source device 120 and destination device 140 may be equipped for wireless or wired communication.

Referring to FIG. 1, source device 120 may include an image/video preprocessor 122, an image/video encoder 124, and an output interface 126. Destination device 140 may include an input interface 142, an image/video decoder 144, and one or more machine vision applications 146. Image/video preprocessor 122 preprocesses image data, i.e., image(s) or video(s), and generates an input bitstream for image/video encoder 124. Image/video encoder 124 encodes the input bitstream and outputs an encoded bitstream 162 via output interface 126. Encoded bitstream 162 is transmitted through a communication medium 160, and received by input interface 142. Image/video decoder 144 then decodes encoded bitstream 162 to generate decoded data, which can be utilized by machine vision applications 146.

More specifically, source device 120 may further include various devices (not shown) for providing source image data to be preprocessed by image/video preprocessor 122. The devices for providing the source image data may include an image/video capture device, such as a camera, an image/video archive or storage device containing previously captured images/videos, or an image/video feed interface to receive images/videos from an image/video content provider.

Image/video encoder 124 and image/video decoder 144 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware, or any combinations thereof. When the encoding or decoding is implemented partially in software, image/video encoder 124 or image/video decoder 144 may store instructions for the software in a suitable, non-transitory computer-readable medium and execute the instructions in hardware using one or more processors to perform the techniques consistent this disclosure. Each of image/video encoder 124 or image/video decoder 144 may be included in one or more encoders or decoders, either of which may be integrated as part of a combined encoder/decoder (CODEC) in a respective device.

Image/video encoder 124 and image/video decoder 144 may operate according to any video coding standard, such as Advanced Video Coding (AVC), High Efficiency Video Coding (HEVC), Versatile Video Coding (VVC), AOMedia Video 1 (AV1), Joint Photographic Experts Group (JPEG), Moving Picture Experts Group (MPEG), etc. Alternatively, image/video encoder 124 and image/video decoder 144 may be customized devices that do not comply with the existing standards. Although not shown in FIG. 1, in some embodiments, image/video encoder 124 and image/video decoder 144 may each be integrated with an audio encoder and decoder, and may include appropriate MUX-DEMUX units, or other hardware and software, to handle encoding of both audio and video in a common data stream or separate data streams.

Output interface 126 may include any type of medium or device capable of transmitting encoded bitstream 162 from source device 120 to destination device 140. For example, output interface 126 may include a transmitter or a transceiver configured to transmit encoded bitstream 162 from source device 120 directly to destination device 140 in real-time. Encoded bitstream 162 may be modulated according to a communication standard, such as a wireless communication protocol, and transmitted to destination device 140.

Communication medium 160 may include transient media, such as a wireless broadcast or wired network transmission. For example, communication medium 160 may include a radio frequency (RF) spectrum or one or more physical transmission lines (e.g., a cable). Communication medium 160 may form part of a packet-based network, such as a local area network, a wide-area network, or a global network such as the Internet. In some embodiments, communication medium 160 may include routers, switches, base stations, or any other equipment that may be useful to facilitate communication from source device 120 to destination device 140. For example, a network server (not shown) may receive encoded bitstream 162 from source device 120 and provide encoded bitstream 162 to destination device 140, e.g., via network transmission.

Communication medium 160 may also be in the form of a storage media (e.g., non-transitory storage media), such as a hard disk, flash drive, compact disc, digital video disc, Blu-ray disc, volatile or non-volatile memory, or any other suitable digital storage media for storing encoded image data. In some embodiments, a computing device of a medium production facility, such as a disc stamping facility, may receive encoded image data from source device 120 and produce a disc containing the encoded video data.

Input interface 142 may include any type of medium or device capable of receiving information from communication medium 160. The received information includes encoded bitstream 162. For example, input interface 142 may include a receiver or a transceiver configured to receive encoded bitstream 162 in real-time.

Machine vision applications 146 include various hardware and/or software for utilizing the decoded image data generated by image/video decoder 144. For example, machine vision applications 146 may include a display device that displays the decoded image data to a user and may include any of a variety of display devices such as a cathode ray tube (CRT), a liquid crystal display (LCD), a plasma display, an organic light emitting diode (OLED) display, or another type of display device. As another example, machine vision applications 146 may include one or more processors configured to use the decoded image data to perform various machine-vision applications, such as object recognition and tracking, face recognition, images matching, image/video search, augmented reality, robot vision and navigation, autonomous driving, 3-dimension structure construction, stereo correspondence, motion tracking, etc.

Next, exemplary image data encoding and decoding techniques are described in connection with FIGS. 2A-2B and FIGS. 3A-3B.

Figure 2A:
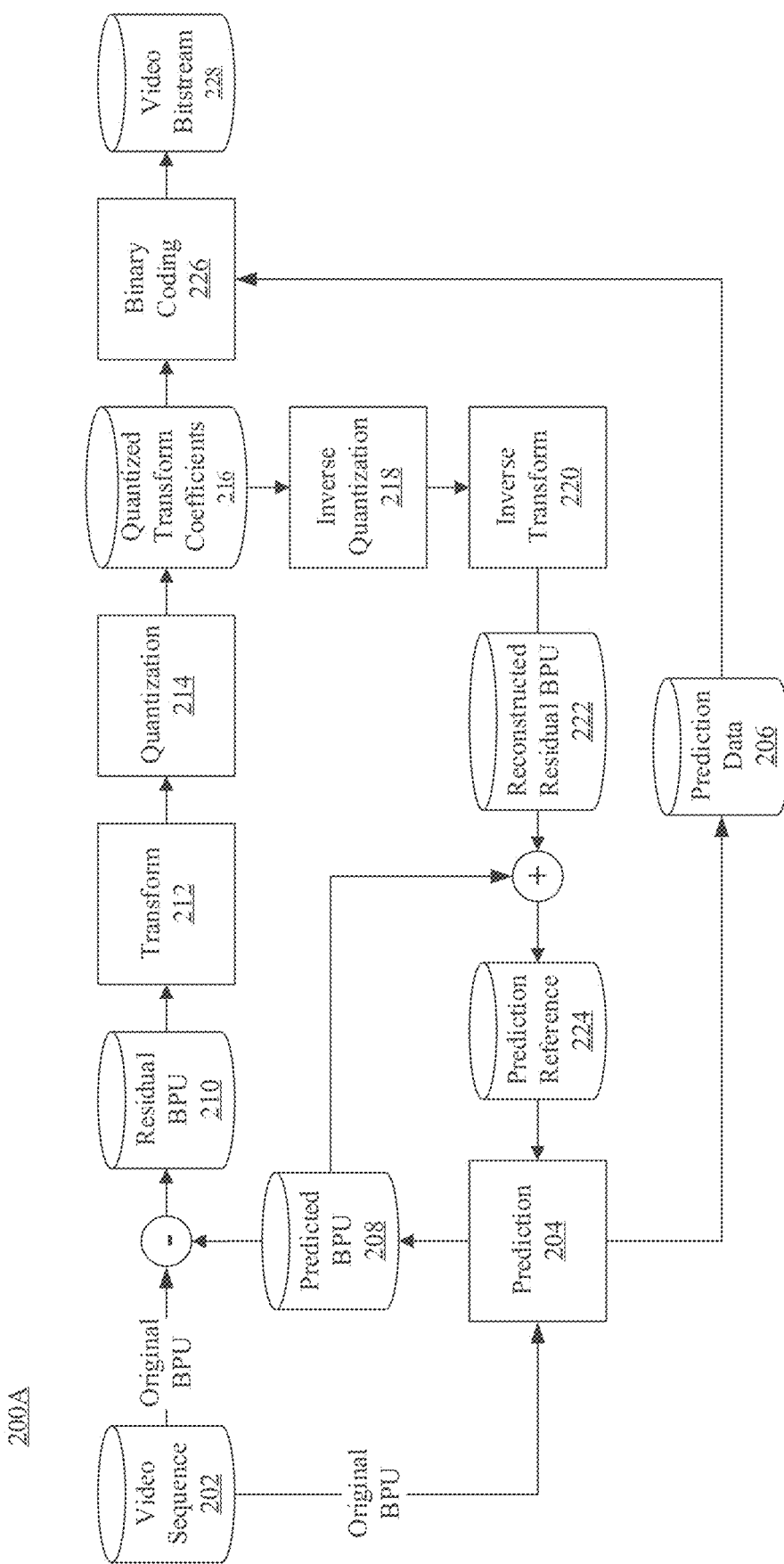
FIG. 2A is a schematic diagram illustrating an exemplary encoding process of a hybrid video coding system, consistent with embodiments of the disclosure.

FIG. 2A illustrates a schematic diagram of an example encoding process 200A, consistent with embodiments of the disclosure. For example, the encoding process 200A can be performed by an encoder, such as image/video encoder 124 in FIG. 1. As shown in FIG. 2A, the encoder can encode video sequence 202 into video bitstream 228 according to process 200A. Video sequence 202 can include a set of pictures (referred to as "original pictures") arranged in a temporal order. Each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
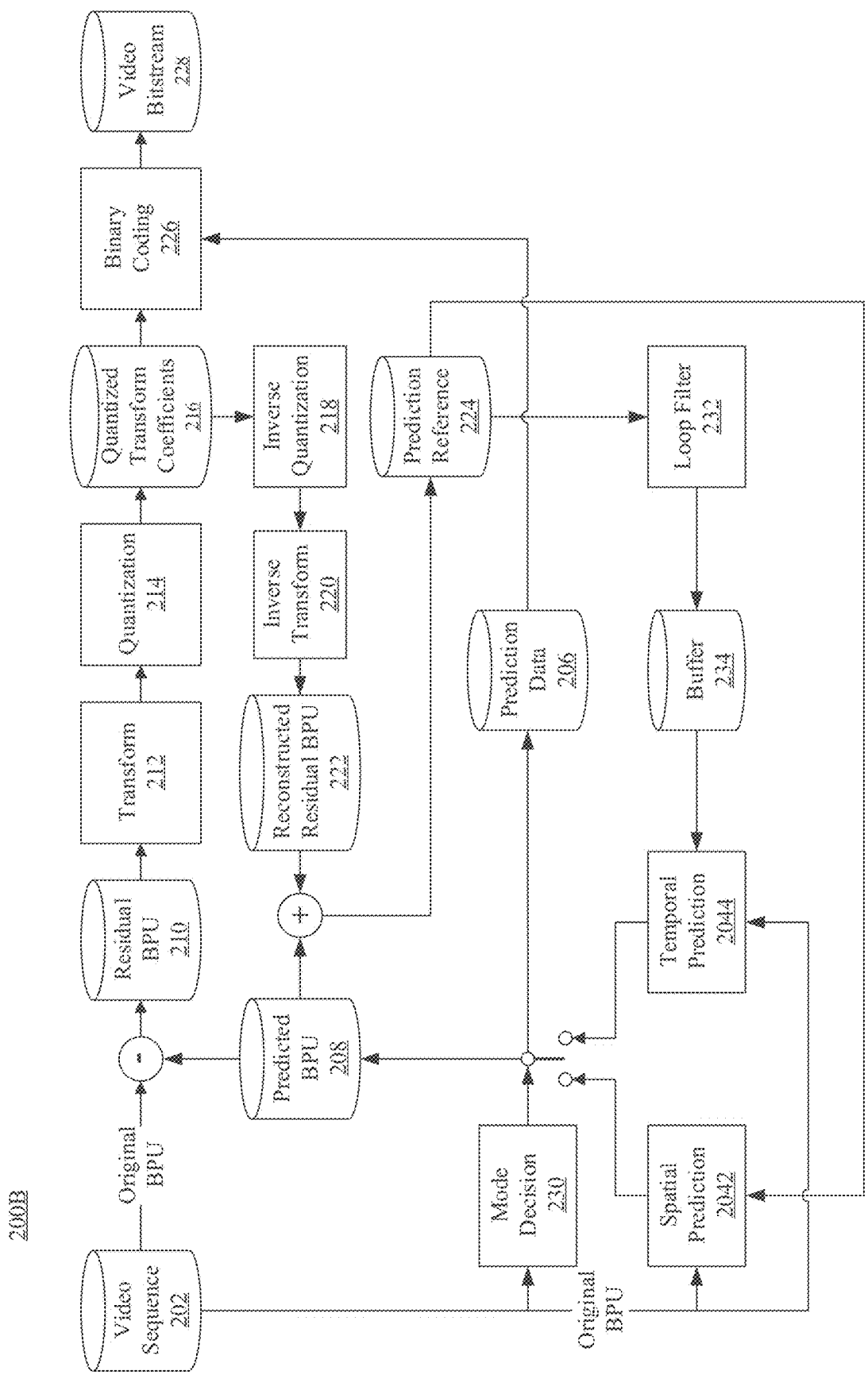
FIG. 2B is a schematic diagram illustrating another exemplary encoding process of a hybrid video coding system, consistent with embodiments of the disclosure.

FIG. 2B illustrates a schematic diagram of another example encoding process 200B, consistent with embodiments of the disclosure. For example, the encoding process 200B can be performed by an encoder, such as image/video encoder 124 in FIG. 1. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline, it can be deemed that the matching region "moves" to the location of the original BPU as time goes by. The encoder can record the direction and distance of such a motion as a "motion vector." When multiple reference pictures are used, the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used, the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. Unidirectional inter predictions use a reference picture that precedes the current picture. Bidirectional inter predictions can use one or more reference pictures at both temporal directions with respect to the current picture.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
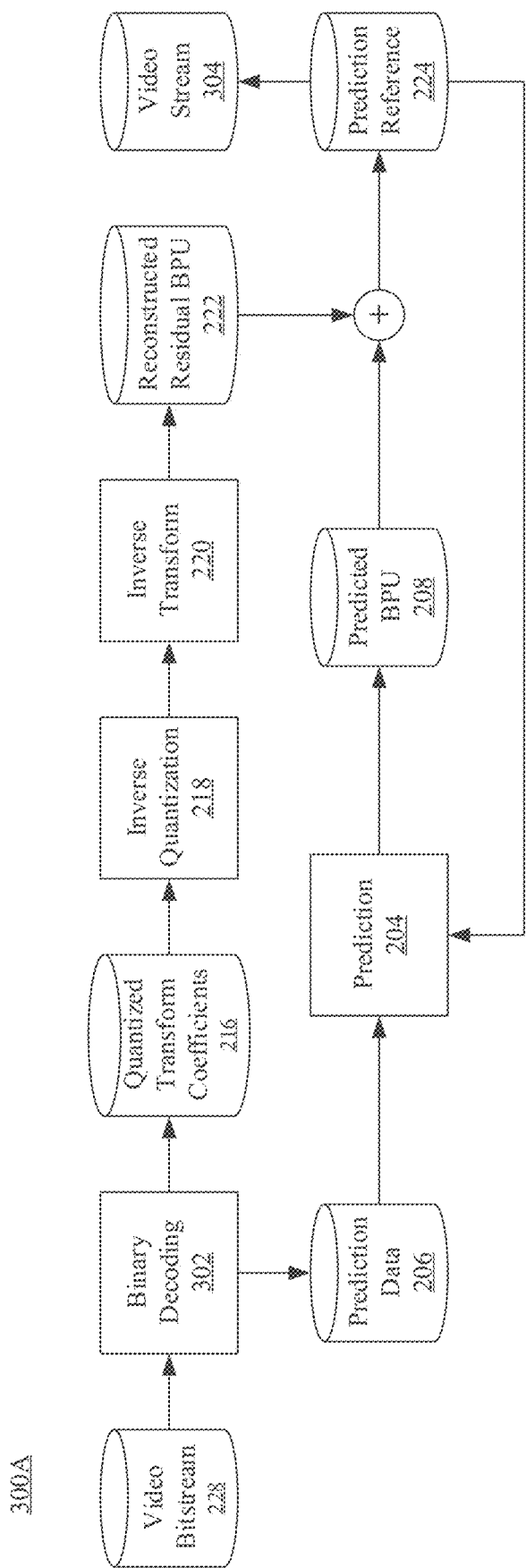
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. For example, the decoding process 300A can be performed by a decoder, such as image/video decoder 144 in FIG. 1. Process 300A can be a decompression process corresponding to the compression process 200A in FIG. 2A. In some embodiments, process 300A can be similar to the reconstruction path of process 200A. A decoder (e.g., image/video decoder 144 in FIG. 1) can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
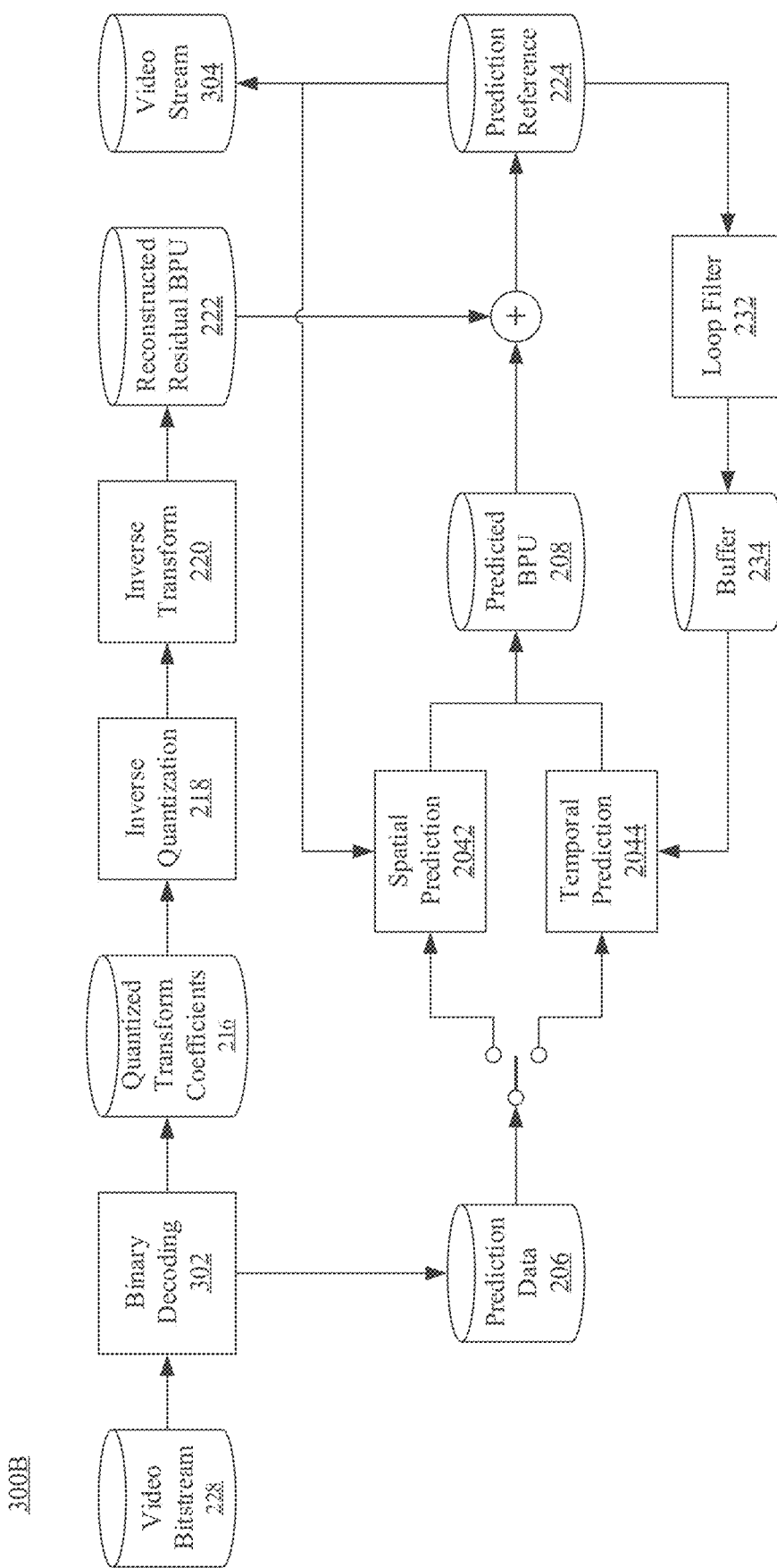
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. For example, the decoding process 300B can be performed by a decoder, such as image/video decoder 144 in FIG. 1. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
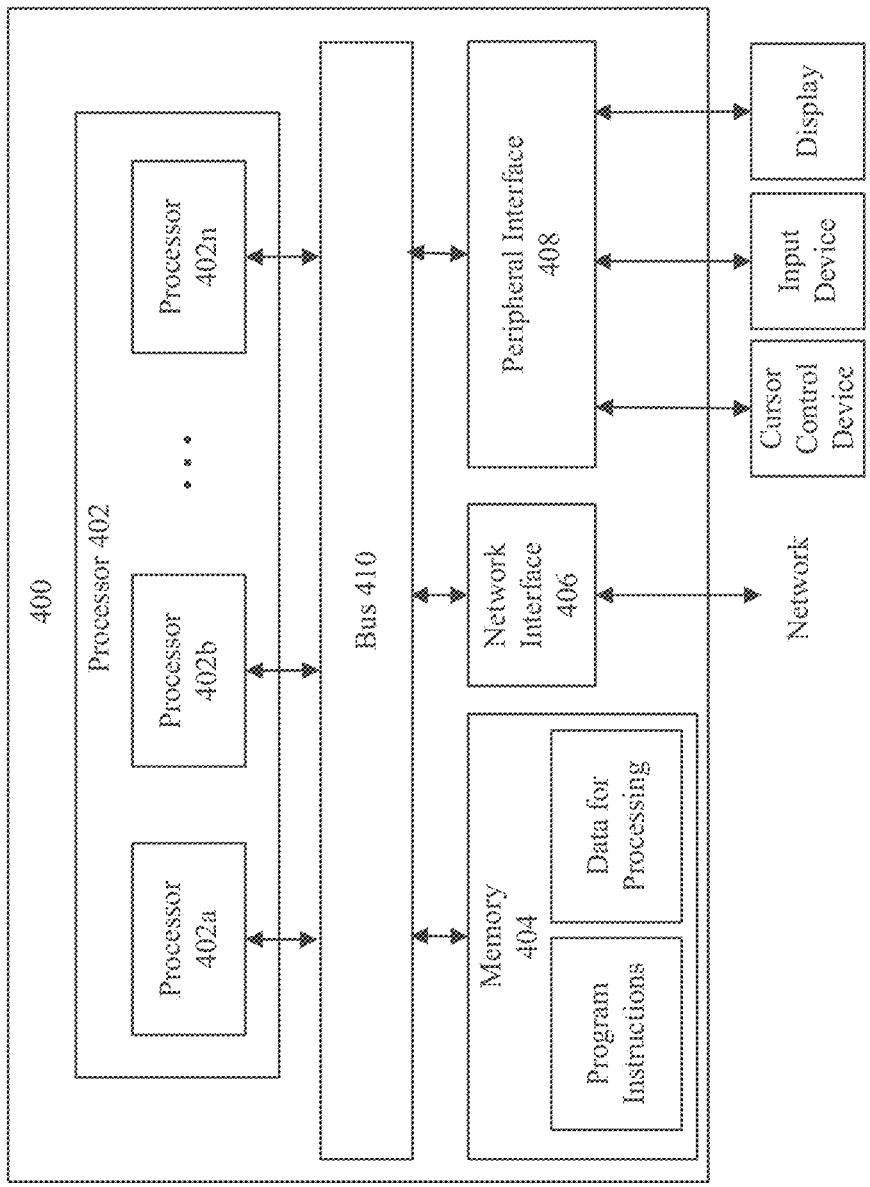
FIG. 4 is a block diagram of an exemplary apparatus for preprocessing or coding image data, according to some embodiments of the present disclosure.

Referring back to FIG. 1, each of image/video preprocessor 122, image/video encoder 124, and image/video decoder 144 may be implemented as any suitable hardware, software, or a combination thereof. FIG. 4 is a block diagram of an example apparatus 400 for processing image data, consistent with embodiments of the disclosure. For example, apparatus 400 may be a preprocessor, an encoder, or a decoder. As shown in FIG. 4, apparatus 400 can include processor 402. When processor 402 executes instructions described herein, apparatus 400 can become a specialized machine for preprocessing, encoding, and/or decoding image data. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

With the development of multimedia processing, transmission and application, there has been an explosive growth of visual data. Moreover, it is impractical to store and transmit the original visual data as the storage and transmission of original visual data expense is huge. Meanwhile, there is enormous redundancy of visual data and it motivates the compact representation of visual data, which makes the storage and transmission of visual data possible in real-world applications. Conventionally, the ultimate consumer of visual data is human vision and the compact representation of visual data is designed towards human perception quality. However, in recent years, with the unprecedent progresses of artificial intelligence, there are many deep learning based machine analysis applications for visual data, denoted as machine vision. In the machine vision oriented applications, machine analysis performance has replaced human perception quality as the ultimate metric for the compression of visual data, which is out of the scope of the visual data compression algorithms designed for human vision. Thus, there is a need to develop the compact representation of visual data towards machine vision. To tackle this problem, the present disclosure provides image data compression methods that use pre-analysis towards machine vision. Specifically, the pre-analysis towards machine vision con extract the critical information of machine analysis for better analysis performance and eliminate the uncorrelated information with machine analysis for more compact representation. Moreover, the disclosed pre-analysis algorithms can be adaptive with human vision oriented compression codecs, which means it is a universal technique for the visual data compression towards machine vision applications.

The development of image/video compression algorithms is coding standard driven. For texture compression, a series of standards have been developed to compress visual data, such as JPEG and JPEG 2000 for still image compression, and H.264/AVC, H.265/HEVC and VVC (Versatile Video Coding) for video data compression. In order to improve the compression performance furthermore, there are numerous algorithms developed for the future video compression standards, including matrix weighted intra prediction, quadtree plus binary, extended coding unit partitioning and mode-dependent non-separable secondary transform. Meanwhile, various optimization algorithms have been proposed in terms of rate-distortion optimization for both texture and feature quality with the encoder optimization. Moreover, with the unprecedented development of visual data understanding, there are tremendous challenges to manage thousands of visual data bitstreams compactly and transmit them simultaneously for further analysis, such as smart cities and Internet of Video Things (IoVT). Furthermore, the analysis performance may be influenced dramatically due to the quality degradation of the feature in the human vision quality oriented compression. To tackle this problem, the standards for compact visual feature representation have also been developed by Moving Picture Experts Group (MPEG) to reduce the representation data size of analysis feature, which could facilitate various intelligent tasks with front-end intelligence. Specifically, the standards of Compact Descriptors for Visual Search (CDVS) and Compact Descriptors for Video Analysis (CDVA) have been finalized, targeting at achieving very compact descriptors for visual data. Moreover, the standardization of video coding for machine has also been launched, in effort to figure a complete picture of the compact representation of visual data in terms of the machine vision.

Moreover, deep learning can be used in various applications, especially in visual data representation and understanding domain. In particular, deep neural network based end-to-end compression frameworks can be used. A recurrent neural network (RNN) can be applied to the end-to-end learned image representation, to achieve a comparable performance compared with JPEG. Motivated by the block based transform in traditional image/video compression, a convolutional neural network (CNN) based end-to-end image compression model can be combined with the discreate cosine transform (DCT) to achieve a comparable performance compared with JPEG at low bitrate. Nonlinear transformation is one of the essential properties of neural networks which is consistent with the human visual system (HVS). Thereout, a generalized divisive normalization (GDN) can be used to optimize the end-to-end nonlinear transform codec for perceptual quality. On the basis of this, a density estimation model can be combined with a cascade of GDNs, to surpass the compression performance of JPEG 2000. The redundancy of the latent code in end-to-end image compression can be further eliminated under an entropy penalization constraint with weight reparameterization, which is implemented with a variational hyper-prior model. In order to further exploit the correlation of the latent representation, an autoregressive model can be used to achieve a superior rate-distortion performance comparing with the current state-of-the-art image codec, BPG, in terms of both PSNR and MS-SSIM distortion metrics. To further improve the accuracy of the entropy models for the rate estimation, a discretized Gaussian Mixture Likelihoods can be used to parameterize the distributions of the latent representations, which could formulate a more accurate and flexible entropy model, and achieve a comparable performance with the latest compression standard VVC regarding bitrate-P SNR performance.

Generally, conventional visual data compression is performed by representing the local and low-level information compactly in a patch-wise manner. However, this could limit the compact representation capability, since the high-level information is not fully utilized. To tackle this problem, pre-analysis can be used to improve the representation performance as it can extract global and high-level information of visual data. Specifically, a visual attention based pre-analysis model can be used to optimize the coding parameter settings for better compression performance. Moreover, pre-analysis can also be applied to the rate control for real-time video coding. From the perspective of coding complexity simplification, pre-analysis can also be applied to the acceleration of the integer motion estimation in JEM.

As described above, there are numerous developments of the visual data compression in recent decades. With the progresses of various machine analysis tasks, some analysis feature compression algorithms are also proposed to improve the visual data compression efficiency towards machine vision and accommodate with the rapid development of machine analysis applications. However, the existing visual data codecs mainly focus on the signal fidelity and human vision quality, not machine vision. In order to improve the representation efficiency of visual data and accommodate with existing codecs, pre-analysis has been investigated but the existing pre-analysis methods mainly focus on the human perception quality, which limits the visual data compact representation performance towards machine vision.

The present disclosure provides pre-analysis based compression methods that are suitable for machine vision.

Figure 5:
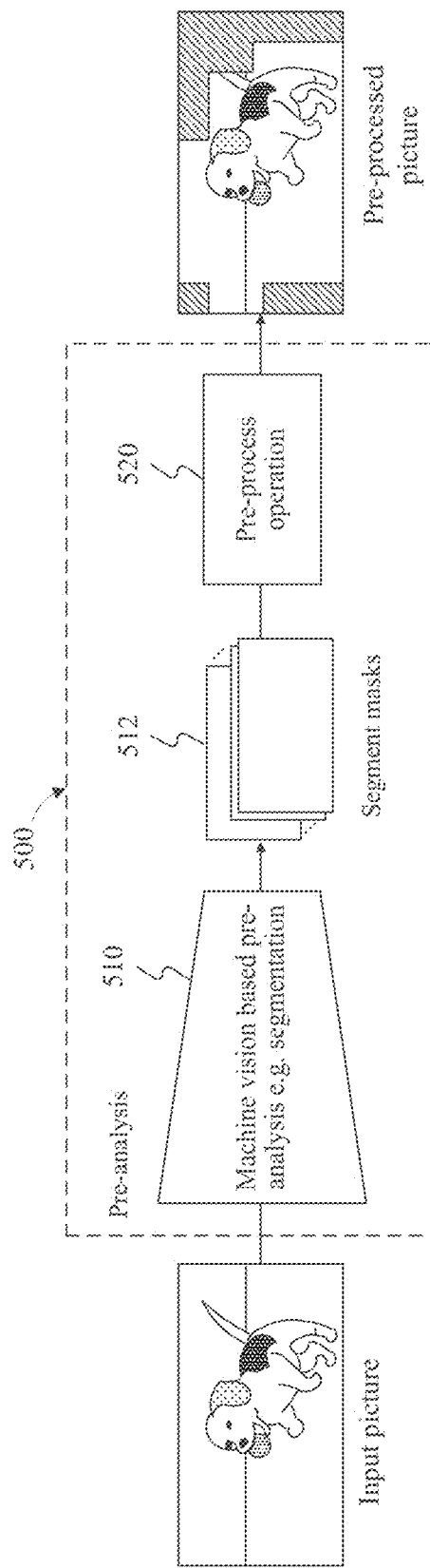
FIG. 5 is a schematic diagram illustrating an exemplary compression method for visual data compression towards machine vision, according to some embodiments of the present disclosure.

FIG. 5 is a schematic diagram illustrating an exemplary compression method 500 for visual data compression towards machine vision, according to some embodiments consistent with the present disclosure. For example, method 500 may be performed by image/video preprocessor 122 (FIG. 1). As shown in FIG. 5, method 500 includes two stages: a machine vision based pre-analysis stage 510 and a pre-processing stage 520. Specifically, machine vision based pre-analysis stage 510 performs high-level information extraction by means of machine analysis models, e.g., instance segmentation, and detects one or more segment masks 512 corresponding to one or more instances (i.e., objects or foregrounds) respectively. Pre-analysis stage 510 may also run a classifier (e.g., a neural network classifier) to determine a class (not shown in FIG. 5) associated with each of the segment masks 512. The class may be an object class indicating a type of the object (e.g., face, tree, animal, building, etc.) associated with the respective segment mask. Pre-processing stage 520 includes operations formulated based on the output of pre-analysis stage 510 (e.g., the segment masks and the predicted classes) for the trade-off between machine vision performance and the representation compactness. Pre-analysis stage 510 may employ a machine analysis model, such as Faster R-CNN and Mask R-CNN.

For example, Mask R-CNN is a deep learning model that combines object detection and instance segmentation. According to some embodiments, the overall architecture of an exemplary Mask R-CNN can include: (1) Backbone Network, (2) Region Proposal Network (RPN), (3) ROIAlign, and (4) Mask Head.

(1) Backbone Network: The backbone network can be a pre-trained convolutional neural network, such as ResNet or ResNeXt. This backbone processes the input image and generates corresponding feature maps.

(2) Region Proposal Network (RPN): The RPN is responsible for generating region proposals or candidate bounding boxes that might contain objects within the image. It operates on the feature map produced by the backbone network and proposes potential regions of interest (ROI).

(3) ROIAlign: The primary purpose of ROIAlign is to align the features within a region of interest (ROI) with the spatial grid of the output feature map. This alignment may prevent information loss that can occur when quantizing the ROI's spatial coordinates to the nearest integer (as done in ROI pooling).

(4) Mask Head: The Mask Head is an additional branch in Mask R-CNN, responsible for generating segmentation masks for each region proposal. The head uses the aligned features obtained through ROIAlign to predict a binary mask for each object, delineating the pixel-wise boundaries of the instances.

During training, the Mask R-CNN model is jointly optimized using a combination of classification loss, bounding box regression loss, and mask segmentation loss. This allows the Mask R-CNN model to learn to simultaneously detect objects, refine their bounding boxes, and produce precise segmentation masks.

As described above, once pre-analysis stage 510 determines one or more instances in the input picture belonging to region of interest (ROI), the instances can be further filtered out by the corresponding segment masks 512 by pre-processing stage 520. The background part of the input picture can then be omitted and will not participate in the latter processing. Compared with the original input picture, the part filtered out with less picture information will provide possibility for a better performance of image coding, especially for a machine vision. In the above-described example, the machine vision pre-analysis model is instance segmentation and the output of the pre-analysis stage includes the segment masks and predicted classes. However, it is contemplated that the disclosed embodiments are not limited to the above example, and can use any suitable machine vision pre-analysis and pre-processing techniques to improve the representation efficiency of visual data towards machine vision.

Figure 6A:
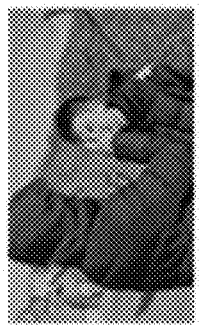
FIG. 6A, FIG. 6B, FIG. 6C, FIG. 6D, and FIG. 6E schematically illustrate various ways for pre-processing an input picture based on a pre-analysis result, according to some embodiments of the present disclosure.
Figure 6B:
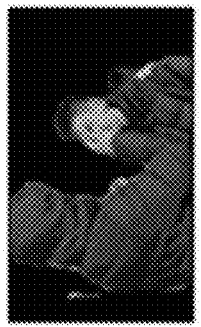

Next, details of pre-processing stage 520 are described. FIGS. 6A-6E schematically illustrate various ways for pre-processing an input picture based on a pre-analysis result, according to some embodiments of the present disclosure. In some embodiments, the pre-processing operations can be performed on the segment masks directly. Specifically, since the compressed visual data is consumed by machine vision, only the machine analysis related information is essential and needs to be preserved. The machine analysis related information includes the segment masks outputted by the pre-analysis stage (e.g., pre-analysis stage 510 in FIG. 5). For example, FIG. 6A shows an input picture showing multiple objects (e.g., people) respectively corresponding to multiple instances (i.e., segment masks) identified in the pre-analysis stage. To pre-process the segment masks directly, the segment masks of the multiple instances are combined together to achieve a merged mask in a union set manner. For example, as shown in FIG. 6B, the segment masks corresponding to the objects (i.e., people) can be combined to form a merged mask. Only the information within the merged mask is preserved for further compression. The technical aspects of FIGS. 6A-6E will be further described in conjunction with FIGS. 7-15. However, as can be understood by the skilled person, although some of these drawings may be collaborative described below, it does not necessarily mean that their corresponding embodiments should be realized in a combined manner.

Figure 6C:
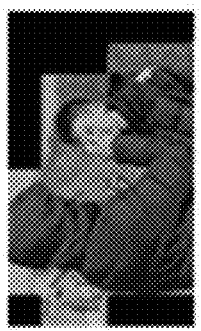

In some embodiments, block based pre-processing may be used to process the segment masks outputted by the pre-analysis stage. Different from preserving the instance mask region only to extract the most intrinsic information, the regions around the merged mask are also important to achieve a better discrimination for instances. Motivated by this, as shown in FIG. 6C, a block based pre-process operation can be used to preserve the visual information around the instances. Specifically, a slide window $s_n$ is performed on the merged mask and the window size is n×n, wherein n may be, e.g., 128, 192, or 256. The information of the original visual data can be preserved whenever there is intersection between the slide window $s_n$ and the merged mask, as shown in FIG. 6C. FIGS. 14A and 14B schematically illustrates a block based pre-processing, which will be described below.

Figure 6D:
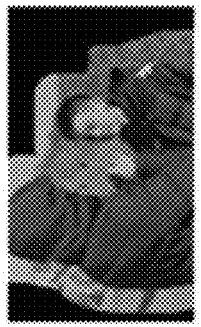

In some embodiments, dilation based pre-processing may be used to process the segment masks outputted by the pre-analysis stage. Dilation is an important image processing method. In this document, it is accompanied with the pre-process operation to preserve the information around the predicted instances. Specifically, as shown in FIG. 6D, the dilation is performed on the merged mask to extend the predicted instance region and the kernel size is k×k with t iterations, such as 7×7 and 3 respectively. Similarly, the information of the original visual data in corresponding regions can be preserved for further compression, as shown in FIG. 6D. FIGS. 15A-15D schematically illustrates a dilation based pre-processing, which will be described below.

Figure 6E:
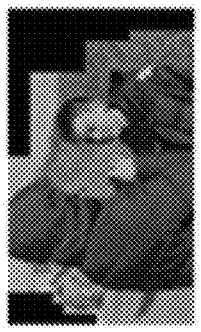

In some embodiments, the block based pre-processing and dilation based pre-processing may be combined to process the segment masks outputted by the pre-analysis stage. The granularity of block based pre-process operation is coarse and it might introduce redundancy information. However, the irregular boundaries of the processed visual data with dilated based pre-process operation can increase the representation expense of visual data compression, especially for the block based compression codecs, such as HEVC and VVC. To tackle this problem, as shown in FIG. 6E, a dilation and block based pre-process operation can be used. Specifically, a dilation based pre-process is first performed and a block based pre-process is performed on the basis of the output of the dilate based pre-process. Here, the slide window size $n_s$ can be smaller, such as 64 and 128, as shown in FIG. 6E.

In some embodiments, blur pre-processing can be used to improve the smoothness and representation compactness of the image data. To prevent the blurring of the merged mask region, where the objects locate, from degrading the performance or precision of machine vision tasks (e.g., object recognition or tracking), the output of the blur pre-processing $I_{blur}$ may be formulated as, for example, $I_{blur}=G_k(M_{bd}-M)I+MI$, where I is the original image, M is the merged mask, $M_{bd}$ is the mask after block and/or dilation based pre-processing, and $G_k$ is the Gaussian filter with kernel size k. This way, in the block and/or dilation pre-processed image, the blur pre-processing is only applied to the image regions other than (i.e., not overlapping with) the merged mask, thereby improving the compression efficiency without deteriorating the machine analysis performance.

In some embodiments, to improve the compression efficiency, the pre-processing stage can be adaptively performed based on the quantization parameter (QP) and/or the definition of the input visual data.

Specifically, lower QP means higher representation expense and better visual data reconstruction quality when the compression codec is conventional codecs, such as HEVC and VVC. When the QP is high (e.g., larger than 32), the representation expense is limited and the instance regions should be allocated with more coding bits for better reconstruction quality. As such, the slide window size n in the block based pre-processing and the kernel size in the dilation based pre-processing can be made smaller, such as 64 and 3×3, respectively. Moreover, in the high QP situation, the blur pre-processing can also be applied to the output of the block and/or dilation based pre-processing to further improve the compression efficiency. Conversely, when the QP is small (e.g., smaller than 32), the coding expense is sufficient and more information of the original visual data can be preserved for better machine analysis performance. For example, the window size and kernel size can be 256 and 9×9, respectively.

Moreover, the definition of the input visual data is also important. For visual data with large definition (e.g., larger than 1920×1080), the slide window size of the block based pre-processing and the kernel size of the dilation based pre-processing can be made larger, such as 256 and 7×7, respectively. Conversely, for visual data with small definition (e.g., smaller than 1920×1080), the slide window size of the block based pre-processing and the kernel size of the dilation based pre-processing be made smaller, such as 128 and 3×3, respectively.

Consistent with the disclosed embodiments, the adaptive pre-processing can be based on the QP, the input picture's definition, or a combination thereof.

Figure 7:
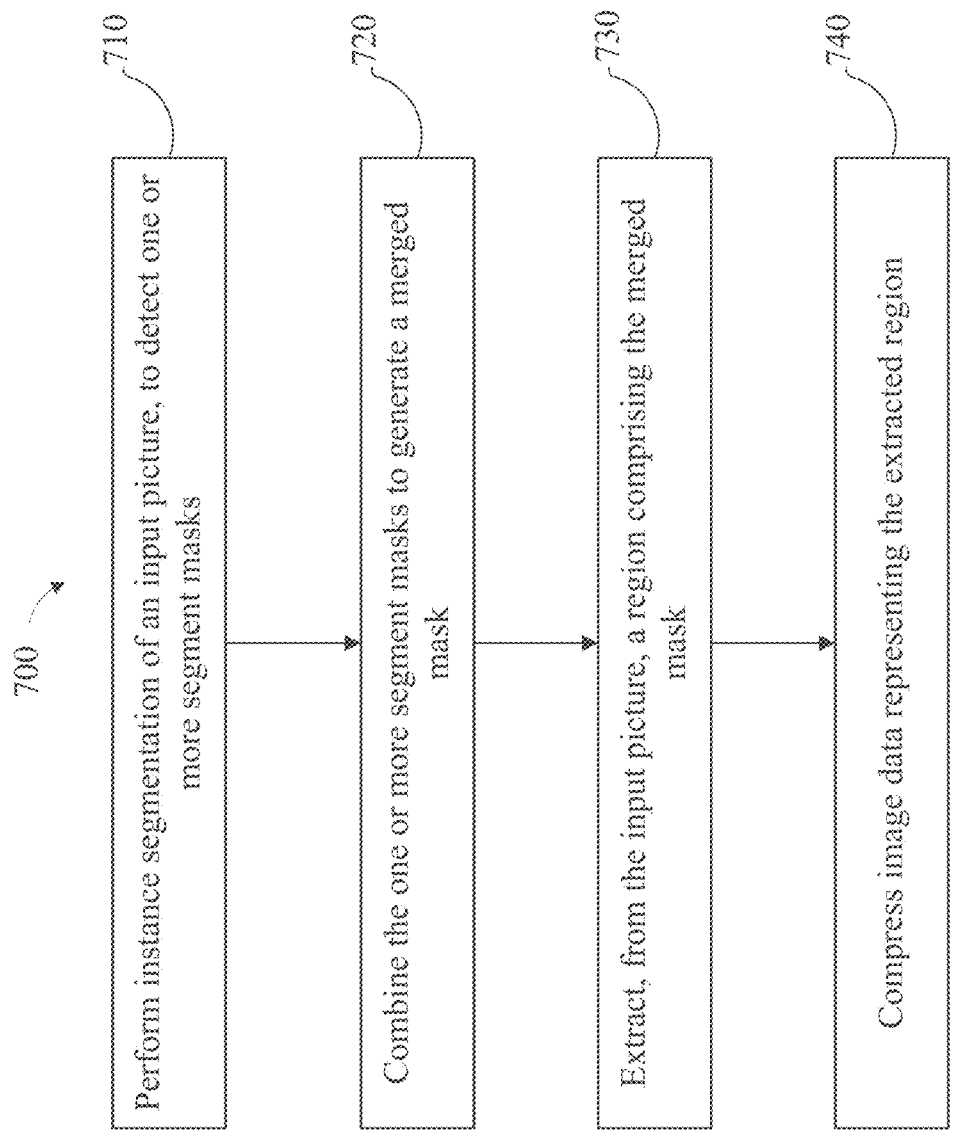
FIG. 7 is a flowchart of an exemplary image data compression method, according to some embodiments of the present disclosure.

FIG. 7 is a flowchart of an exemplary image data compression method 700, according to some embodiments of the present disclosure. For example, method 700 may be performed by one or more processors, such as image/video preprocessor 122 (FIG. 1) and/or image/video encoder 124 (FIG. 1). In some embodiments, image/video preprocessor 122 and image/video encoder 124 may be integrated into apparatus 400 shown in FIG. 4, such that method 700 can be performed by apparatus 400. As shown in FIG. 7, method 700 includes the following steps 710-740.

At step 710, a processor performs instance segmentation of an input picture, to generate one or more segment masks.

Figure 13D:
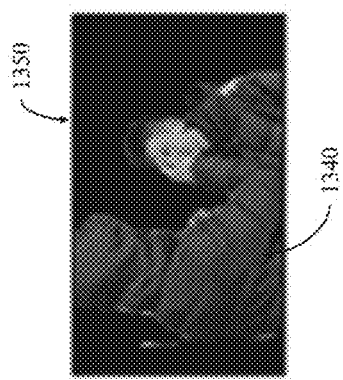
FIG. 13A, FIG. 13B, FIG. 13C, and FIG. 13D schematically illustrates pre-processing an input picture based on a pre-analysis result, according to some embodiments of the present disclosure.
Figure 13C:
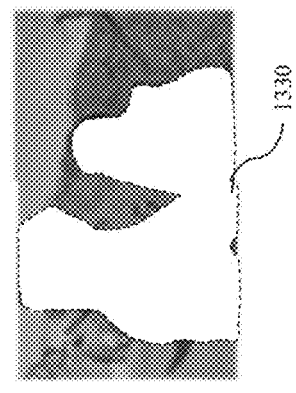
Figure 13A:
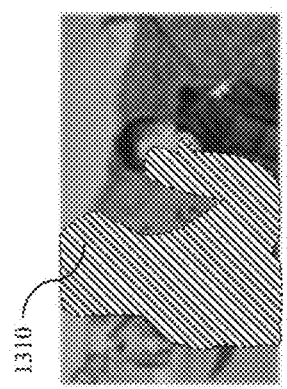
Figure 13B:
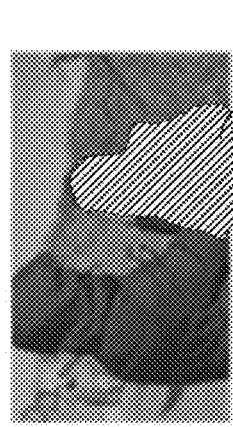

Specifically, the processor may execute an instance segmentation algorithm to partition an input picture into multiple segments, e.g., sets of pixels each of which representing a portion of the input picture. The instance segmentation algorithm may assign a label (i.e., category) to each set of pixels, such that pixels with the same label share certain common characteristics. The processor may then group the pixels according to their labels and designate each group as a distinct object, i.e., segment mask. On the basis on the labels, the processor may determine the boundary of each segment mask. The labels do not necessarily belong to different kinds. For example, the two people in FIG. 6B may be labelled differently, but they may belong to the same kind of object—people. In some embodiments of this disclosure, each of the two people is an instance and can be detected by the instance segmentation algorithm, respectively. For example, the processor may execute an instance segmentation algorithm to the input image as shown in FIGS. 13A-13D. As a result, the pixel belonging to the instances (two people) may be labeled as "person-A" and "person-B". Meanwhile, segment masks 1310 and 1320 are generated accordingly as shown in FIGS. 13A and 13B, wherein mask 1310 is generated by grouping the pixels of "person-A" and mask 1320 is generated by grouping the pixels of "person-B".

In some embodiments, after the segment masks are generated, the processor may also execute a classification algorithm to determine an object class associated with each of the segment masks. For example, the classification algorithm may be implemented using a convolutional neural network (CNN), deep neural network (DNN), or recurrent neural network (RNN).

Referring back to FIG. 7, at step 720, the processor combines the one or more segment masks to generate a merged mask. Specifically, the merged mask may form a connected region in the input picture. For example, as shown in FIG. 6B, the segment masks corresponding to the multiple people can be merged to form one connected region. Turning to FIG. 13C, segment mask 1310 and segment mask 1320 are here combined to form the merged mask 1330. The combination of different segment masks will reduce the number of masks, thus reducing the burden of computation for image processing. On the other hand, the combination of different segment masks, along with other morphological techniques (e.g., block base pre-processing or dilation based pre-processing) described below, will reduce the risk of losing parts of the instance due to the miss-segmentation performed at step 710, which may also be region of interest (ROI) of an input picture.

In some embodiments, the generated segment masks at step 710 may be isolated from each other. Under this condition, the merged mask that combined with isolated masks is composed of several parts that are non-overlapping. In some other embodiments, the generated segment masks at step 710 may be adjacent to each other. Under this condition, the merged mask is made up of several connected regions. As shown in FIGS. 13C and 13D, the merged mask 1330 and corresponding region 1340 can be kept in the picture for the latter processing, while the background region 1350 in the input picture may be discarded and may not participate in the latter processing.

Referring back to FIG. 7, at step 730, the processor extracts, from the input picture, a region comprising the merged mask.

In some embodiments, the extracted region includes the merged mask only. For example, as shown in FIG. 6B, only the merged mask is extracted from the input picture.

In some embodiments, the extracted region not only includes the merged mask, but also includes an extended region surrounding the merged mask. For example, as shown in FIGS. 6c-6e, the block based pre-processing and the dilation based pre-processing may be used to create an extended region surrounding the merged mask.

As already mentioned above, the merged mask may be composed of several parts that are not adjacent to each other, which will increase the complexity or decrease the efficiency of image coding somehow. A morphological processing with the merged mask will bring in parts that may be region of interest (ROI), and in some cases, it will bridge the non-overlapping parts to a unified whole.

Figure 8:
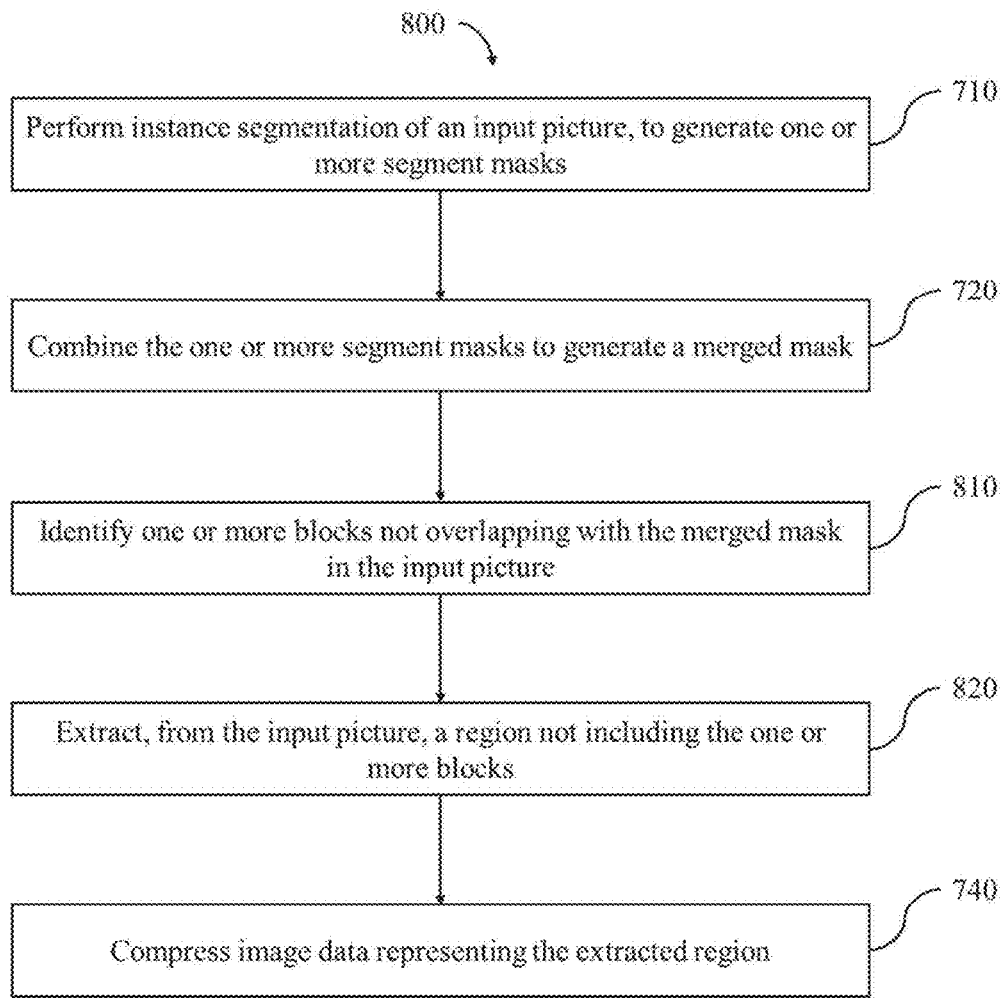
FIG. 8 is a flowchart of an exemplary image data compression method, according to some embodiments of the present disclosure.

When the block based pre-processing is used, the processor applies a slide window to the image region outside the merged mask, to identify one or more blocks not overlapping with the merged mask. The processor then extracts, from the input picture, a region not including the one or more blocks. FIG. 8 shows a block based pre-processing, which will be described in detail below.

Figure 9:
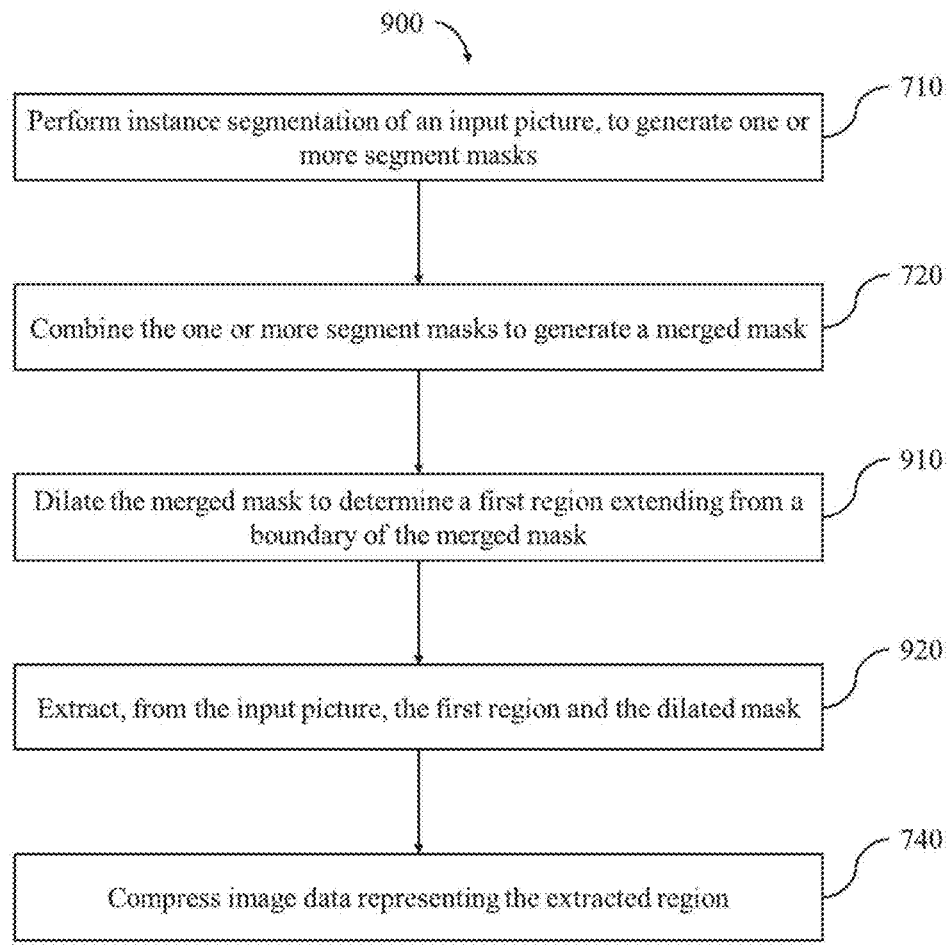
FIG. 9 is a flowchart of an exemplary image data compression method, according to some embodiments of the present disclosure.

When the dilation based pre-processing is used, the processor applies a kernel to the merged mask to determine a first region extending from a boundary of the merged mask. The processor then extracts, from the input picture, the first region and the merged mask. FIG. 9 shows a dilation based pre-processing, which will be described in detail below.

Figure 10:
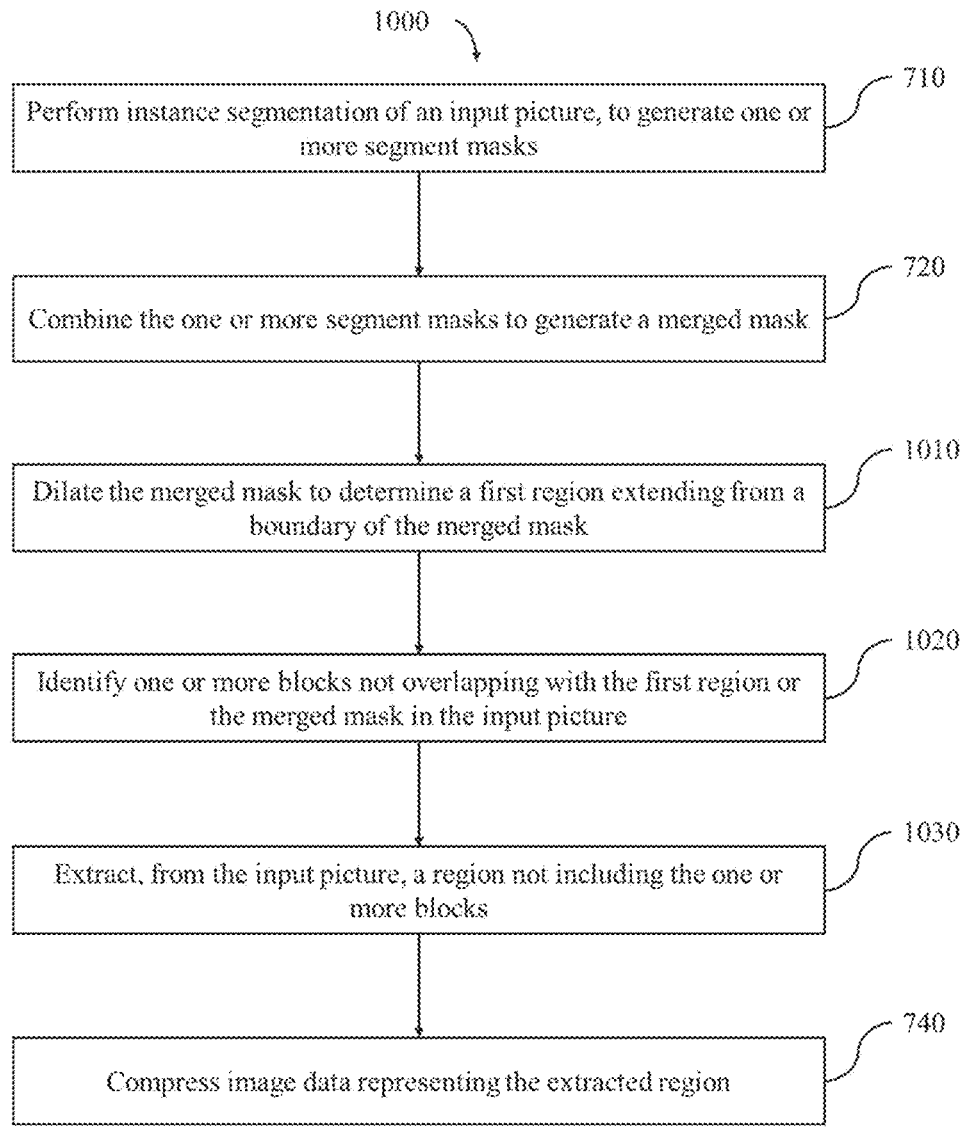
FIG. 10 is a flowchart of an exemplary image data compression method, according to some embodiments of the present disclosure.

In some embodiments, the block based pre-processing and the dilation based pre-processing can be combined. Frist, the processor dilates the merged mask by applying a kernel to the merged mask to determine a first region extending from a boundary of the merged mask. Next, the processor identifies, in the input picture, one or more blocks not overlapping with the first region or the merged mask. Finally, the processor extracts, from the input picture, a region not including the one or more blocks. FIG. 10 shows a block based and dilation based pre-processing, which will be described in detail below.

Figure 12:
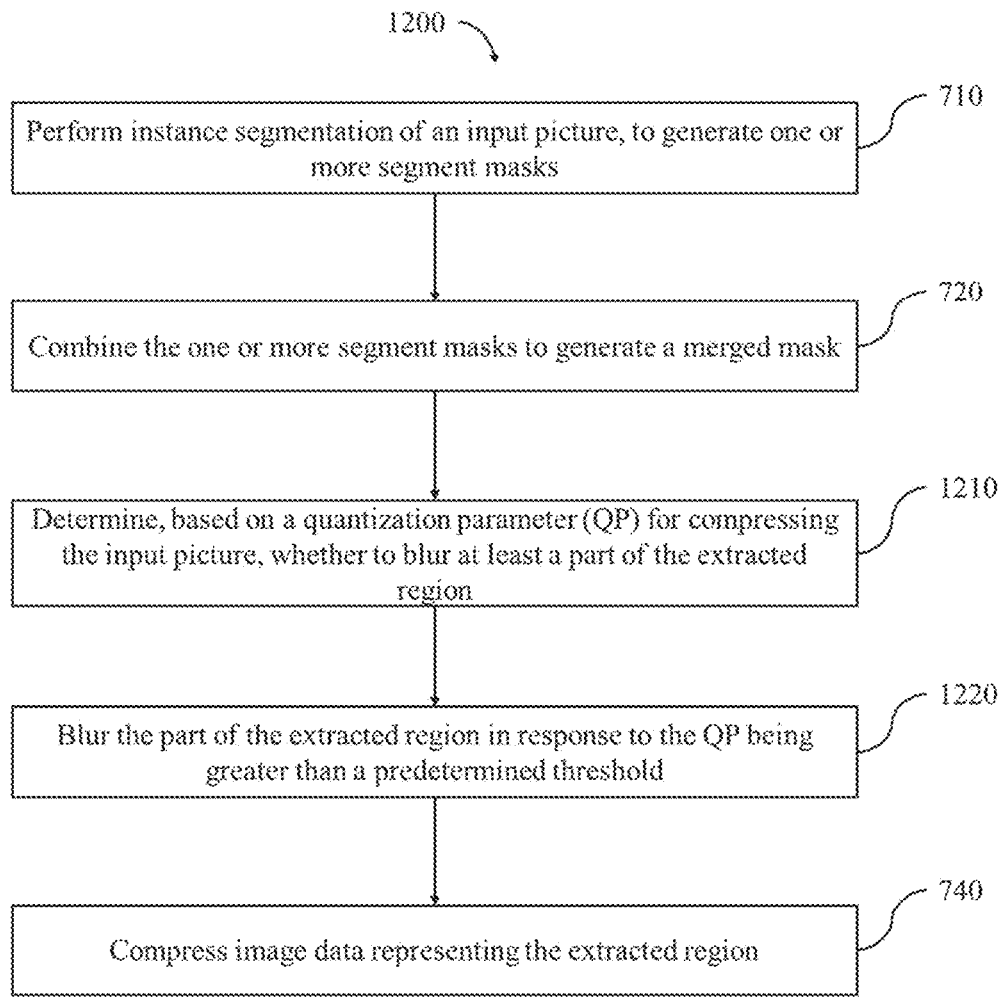
FIG. 12 is a flowchart of an exemplary image data compression method, according to some embodiments of the present disclosure.

In some embodiments, blur pre-processing can be applied to the region comprising the merged mask. Specifically, in the block and/or dilation pre-processed image, the blur pre-processing is applied to the extended region surrounding the merged mask to remove details or simply content in the extended region. Since the extended region does not contain objects, blurring it does not affect the precision of machine vision tasks. FIG. 12 shows a blur pre-processing applying to the extend region, which will be described in detail below.

In some embodiments, the block based pre-processing, the dilation based pre-processing, and/or the blur pre-processing can be performed adaptively based on the quantization parameter (QP) for compressing the input picture, or the definition of the input picture. For example, in high QP situation (e.g., when the QP is greater than a predetermined threshold), the slide window size in the block based pre-processing and the kernel size in the dilation based pre-processing can be made smaller, and the blur pre-processing can also be used to blur the image regions other than the merged mask. Conversely, in low QP situation (e.g., when the QP is lower than or equal to a predetermined threshold), the slide window size in the block based pre-processing and the kernel size in the dilation based pre-processing can be made larger, and the blur pre-processing can be skipped. FIG. 12 shows a blur pre-processing based on QP, which will be described in detail below.

Referring back to FIG. 7, at step 740, the processor compresses image data representing the extracted region. Specifically, the image data can be fed into a codec for compression with the specific QP. The codec may perform encoding and/or decoding according to an image/video standard, such as such as Advanced Video Coding (AVC), High Efficiency Video Coding (HEVC), Versatile Video Coding (VVC), AOMedia Video 1 (AV1), Joint Photographic Experts Group (JPEG), Moving Picture Experts Group (MPEG), etc.

FIG. 8 is a flowchart of an exemplary image data compression method 800 based on method 700 shown in FIG. 7, according to some embodiments of the present disclosure. For example, method 800 may be performed by one or more processors, such as image/video preprocessor 122 (FIG. 1) and/or image/video encoder 124 (FIG. 1). In some embodiments, image/video preprocessor 122 and image/video encoder 124 may be integrated into apparatus 400 shown in FIG. 4, such that method 800 can be performed by apparatus 400. Method 800 applies a block based pre-processing. As illustrated in FIG. 8, step 730 is further disassembled into two sub steps 810 and 820. The other steps inherited from FIG. 7 will not be described again.

Referring to FIG. 8, at step 810, the processor identifies one or more blocks not overlapping with the merged mask in the input picture. The one or more blocks here may not necessarily be the coding blocks used to calculate the motion vectors. In some examples, the one or more blocks may be specially designed for separating instances and background of the input picture. As a non-restrictive example, the processor may apply a slide window to the input picture to identify the one or more blocks not overlapping with the merged mask.

As shown in FIG. 14A, a window can be slid from the up-left to the down-right of the input picture. The window size may be, e.g., 128×128, 192×192, or 256×256 according to the desired granularity of pre-processing. The window slides through A11, A12, . . . , A1$n$, A21, A22, A2$n$, . . . for a pixel-wised traversal. In other words, the sliding step equals the width of the window. Hereinafter, the slide window at certain places is donated as block A11, block A12, . . . , block A1$n$, block A21, block A22, . . . block A2$n$, . . . , for simplicity.

When any of the blocks totally or partially overlap with the merged mask 1330, it will be marked an overlapping block and is represented by filling with solid black as shown in FIG. 14b. For example, block A12, block A13 and block A14 in FIG. 14A each partially overlaps with the merged mask 1330, while block A54 totally overlaps with the merged mask 1330. Thus, these blocks are overlapping blocks and are filled with solid black in FIG. 14B. It should be noted that in FIG. 14B the merged mask 1330 is shown on top of the overlapping blocks 1410. When the overlapping blocks 1410 are determined, the one or more blocks 1420 other than the overlapping blocks (i.e., the blocks not overlapping with the merged mask) in the input picture can be identified as well.

In some embodiments, the size of the slide window can be determined based on the quantization parameter (QP) for compressing the input picture and/or the definition of the input picture. When the QP for compressing the input picture is high or the definition of the input picture is low, the representation expense is limited and the instance regions should be allocated with more coding bits for better reconstruction quality. As such, the size of the slide window can be smaller, e.g., 64×64. To the contrary, when the QP for compressing the input picture is low or the definition of the input picture is high, the size of the slide window can be larger, e.g., 256×256.

Referring back to FIG. 8, at step 820, the processor extracts, from the input picture, a region not including the one or more blocks 1420. In other words, the processor may extract a region at least including the overlapping blocks 1410. In a specific example, the region can be composed of the overlapping blocks 1410. As a skilled person can understand, the regions around the merged mask 1330 are also important to achieve a better discrimination for instances. Method 800 extends from the merged mask to get a region at least composed of the overlapping blocks which covers the instances with relative larger possibility, such that the miss-segmentation exists in the merged mask can be mitigated.

FIG. 9 is a flowchart of an exemplary image data compression method 900 based on method 700 shown in FIG. 7, according to some embodiments of the present disclosure. For example, method 900 may be performed by one or more processors, such as image/video preprocessor 122 (FIG. 1) and/or image/video encoder 124 (FIG. 1). In some embodiments, image/video preprocessor 122 and image/video encoder 124 may be integrated into apparatus 400 shown in FIG. 4, such that method 900 can be performed by apparatus 400. Method 900 applies a dilated based pre-processing. As illustrated in FIG. 9, step 730 is further disassembled into two sub steps 910 and 920. The other steps inherited from FIG. 7 will not be described again.

Referring to FIG. 9, at step 910, the processor dilates the merged mask to determine a first region extending from a boundary of the merged mask in the input picture. As a non-restrictive example, the processor may apply a kernel to the merged mask to determine a first region extending from a boundary of the merged mask.

As show in FIGS. 15A-15D, in some embodiments, a kernel with the shape of kernel 1530, kernel 1540 or kernel 1550 can be used to dilate the merged mask in order to determine a first region 1510 extending from the boundary of the merged mask (not shown for simplicity). In a non-restrictive example, kernel 153 with a size of 7×7 can be applied for dilation. The dilation can be performed with kernel 153 on the merged mask to extend the predicted instance region with 3 iterations, for example. In each iteration, kernel 153 is applied to the input picture for dilation in a pixel-wised manner. As the kernel size is smaller than the slide window, the dilated based pre-processing may possess a better morphological performance than the block based pre-processing, while its computation burden and complexity may be higher.

In some embodiments, the size of the kernel can be determined based on the quantization parameter (QP) for compressing the input picture and/or the definition of the input picture. When the QP for compressing the input picture is high or the definition of the input picture is low, the representation expense is limited and the instance regions should be allocated with more coding bits for better reconstruction quality. As such, the size of the kernel can be smaller, e.g., 3×3. To the contrary, when the QP for compressing the input picture is low or the definition of the input picture is high, the size of the kernel can be larger, e.g., 7×7.

Referring back to FIG. 9, at step 920, the processor extracts, from the input picture, the first region and the optional dilated mask. As can be seen from FIG. 15A, the first region 1510 is extracted from the input picture by dilation, while the remaining region 1520 other than the first region 1510 in the input picture can be omitted from the latter processing. As a skilled person can understand, the regions around the merged mask are also important to achieve a better discrimination for instances. Method 900 extends from the merged mask to get a first region which covers the instances with relative larger possibility, such that the miss-segmentation exists in the merged mask can be mitigated.

FIG. 10 is a flowchart of an exemplary image data compression method 1000 based on method 700 shown in FIG. 7, according to some embodiments of the present disclosure. For example, method 1000 may be performed by one or more processors, such as image/video preprocessor 122 (FIG. 1) and/or image/video encoder 124 (FIG. 1). In some embodiments, image/video preprocessor 122 and image/video encoder 124 may be integrated into apparatus 400 shown in FIG. 4, such that method 1000 can be performed by apparatus 400. Method 1000 applies a dilated based pre-processing along with a block based pre-processing simultaneously. As illustrated in FIG. 10, step 730 is further disassembled into three sub steps 1010, 1020 and 1030. The other steps inherited from FIG. 7 will not be described again.

Referring to FIG. 10, at step 1010, the processor dilates the merged mask to determine a first region extending from a boundary of the merged mask. The procedure of dilation at step 1010 can follow the process described in FIG. 9 and its corresponding embodiment, which will not be described here for simplicity.

Next, at step 1020, the processor identifies one or more blocks not overlapping with the first region or the merged mask in the input picture. Similar to the method described with respect to FIG. 8, the processor may apply a slide window to the input picture to identify one or more blocks not overlapping with the first region or the merged mask.

For example, a window can be slid from the up-left to the down-right of the input picture for a pixel-wised traversal. The window size may be, e.g., 128×128, 192×192, or 256×256, and the sliding step is the width of the window. When any of the blocks totally or partially overlap with the first region or the merged mask, it will be marked an overlapping block. When the overlapping blocks are determined, the one or more blocks other than the overlapping blocks (i.e., the blocks not overlapping with the first region or the merged mask) in the input picture can be identified as well.

Still referring to FIG. 10, at step 1030, the processor extracts, from the input picture, a region not including the one or more blocks. In other words, the processor extracts a region at least including the overlapping blocks. In a specific example, the region can be composed of the overlapping blocks. As a skilled person can understand, the regions around the merged mask are also important to achieve a better discrimination for instances.

Method 1000 extends from the merged mask to get a region at least composed the overlapping blocks which covers the instances with relative larger possibility, such that the miss-segmentation exists in the merged mask can be mitigated. Compared with method 800 and method 900, method 1000 applies a dilated based pre-processing and a block based pre-processing simultaneously, wherein, in terms of processing operator (i.e., the slide window or the kernel), the block based pre-processing is performed in a relatively larger scale, while the dilated based pre-processing is performed in a relatively small scale. Hence, method 1000 possesses a better morphological performance than method 800 or method 900, which merely adopts a block based pre-processing or a dilated based pre-processing. Here, the slide window size can be smaller compared with method 800, such as 64×64 or 128×128.

Figure 11:
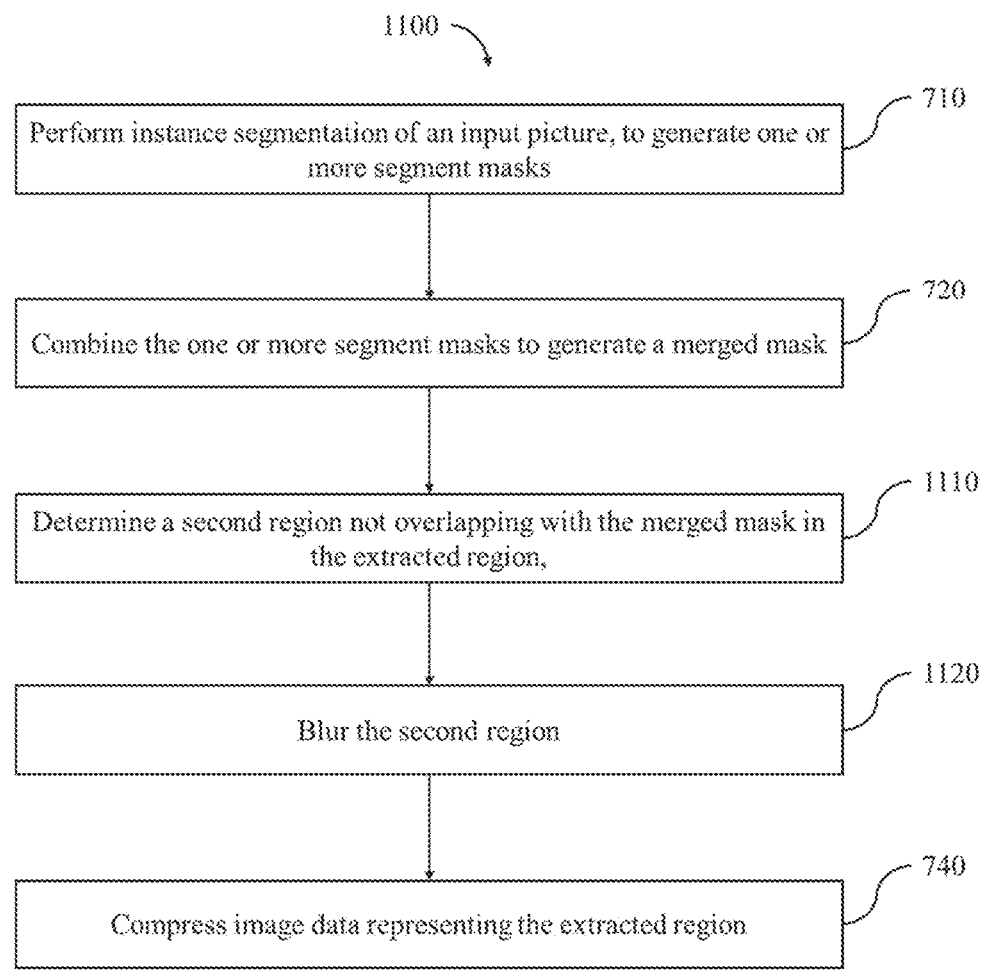
FIG. 11 is a flowchart of an exemplary image data compression method, according to some embodiments of the present disclosure.

FIG. 11 is a flowchart of an exemplary image data compression method 1100 based on method 700 shown in FIG. 7, according to some embodiments of the present disclosure. For example, method 1100 may be performed by one or more processors, such as image/video preprocessor 122 (FIG. 1) and/or image/video encoder 124 (FIG. 1). In some embodiments, image/video preprocessor 122 and image/video encoder 124 may be integrated into apparatus 400 shown in FIG. 4, such that method 1100 can be performed by apparatus 400. Method 1100 applies a blur pre-processing. As illustrated in FIG. 11, step 730 is further disassembled into two sub steps 1110 and 1120. The other steps inherited from FIG. 7 will not be described again.

Referring to FIG. 11, at step 1110, the processor determines a second region not overlapping with the merged mask in the extracted region. As shown in FIG. 14A, a window can be slid from the up-left to the down-right of the input picture. When any of the blocks totally or partially overlap with the merged mask 1330, it will be marked an overlapping block and is represented by filling with solid black as shown in FIG. 14B. It should be noted that the merged mask 1330 is shown on top of the overlapping blocks 1410. When the overlapping blocks 1410 are determined, the one or more blocks 1420 other than the overlapping blocks in the input picture can be identified as well. The one or more blocks 1420 can be used to form the second region. For example, the processor may determine a second region that is made up of some or all of the one or more blocks 1420.

Referring back to FIG. 11, at step 1120, the processor blurs the second region. In some embodiments, the background part of the input image is not simply discarded. Blur pre-processing can be applied to the second region, so as to improve the smoothness and representation compactness of the image data.

In further examples, blur pre-processing can be applied with block and/or dilation pre-processing. To prevent the blurring of the merged mask region, where the objects locate, from degrading the performance or precision of machine vision tasks (e.g., object recognition or tracking), the output of the blur pre-processing $I_{blur}$ may be formulated as, for example, $I_{blur}=G_k(M_{bd}-M)I+MI$, where I is the original image, M is the merged mask, $M_{bd}$ is the mask after block and/or dilation based pre-processing, and $G_k$ is the Gaussian filter with kernel size k. This way, in the block and/or dilation pre-processed image, the blur pre-processing is only applied to the image regions other than (i.e., not overlapping with) the merged mask, thereby improving the compression efficiency without deteriorating the machine analysis performance.

FIG. 12 is a flowchart of an exemplary image data compression method 1200 based on method 700 shown in FIG. 7, according to some embodiments of the present disclosure. For example, method 1200 may be performed by one or more processors, such as image/video preprocessor 122 (FIG. 1) and/or image/video encoder 124 (FIG. 1). In some embodiments, image/video preprocessor 122 and image/video encoder 124 may be integrated into apparatus 400 shown in FIG. 4, such that method 1200 can be performed by apparatus 400. Method 1200 determines whether to carry out a blur pre-processing based on a quantization parameter (QP). As illustrated in FIG. 12, step 730 is further disassembled into two sub steps 1210 and 1220. The other steps inherited from FIG. 7 will not be described again.

Referring to FIG. 12, at step 1210, the processor determines based on a quantization parameter (QP) for compressing the input picture, whether to blur at least a part of the extracted region. In order to compress the input picture further, a part of the extracted region can be blurred somehow. For example, if the input picture is to be compressed with low quality (higher QP), at least a part of the extracted region can be blurred. However, if the input picture is to be quantized with more stages (lower QP), the extracted region may be not supposed to be blurred. A blur pre-processing applied in case of more quantization stages may decrease the quality of coded picture dramatically, which may be not suitable for machine vision.

Still referring to FIG. 12, at step 1210, the processor blurs the part of the extracted region in response to the QP being greater than a predetermined threshold. Furthermore, the blur pre-processing can also be applied to the output of the block and/or dilation based pre-processing to further improve the compression efficiency. However, the processor may not blur any part of the extracted region if the QP is less than the predetermined threshold. In the embodiments of the present disclosure, the segment masks or the merged mask can be applied to the input picture for extracting instances in the input picture. As a skilled person can understand, for example, when the merged mask is applied to the input picture, a part of the picture (where the instances exist) will be covered by the merged mask. Any region of the picture comprising the region covered by the merged mask can be called the region comprising the merged mask, which inherently exists in the present disclosure even without the extra instructions here. Or put it another way, the expression of "extracting a region comprising the merged mask" can also be reproduced as "extracting a region in the input picture where is covered by the applied merged mask". These two expressions possess the same technical contribution to the present disclosure.

Figure 16:
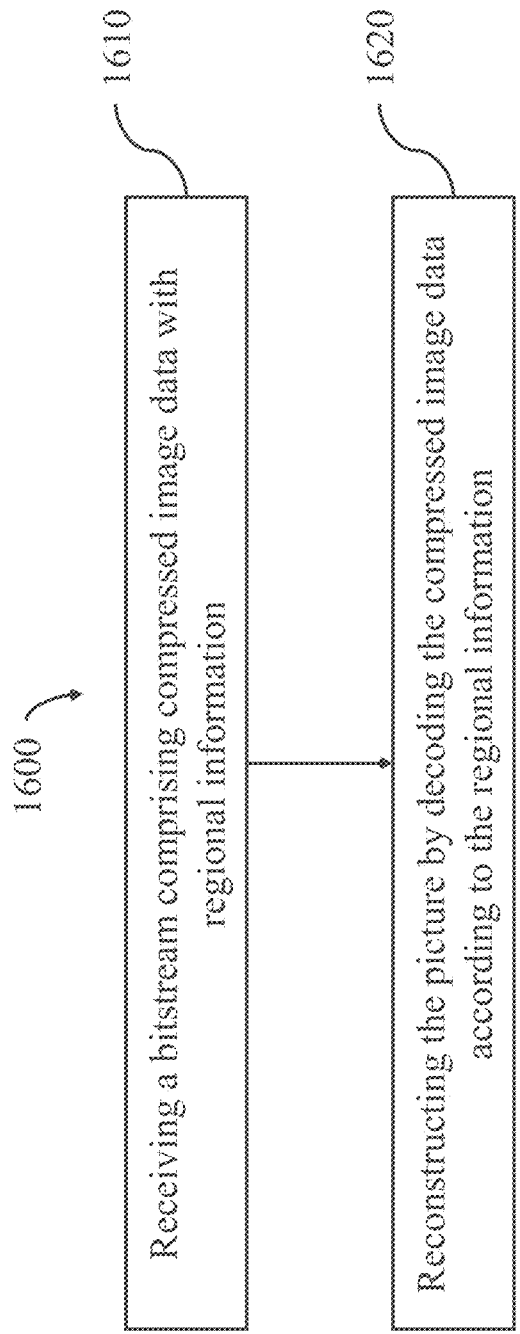
FIG. 16 is a flowchart of an exemplary image data decoding method, according to some embodiments of the present disclosure.

FIG. 16 is a flowchart of an exemplary image data decoding method, according to some embodiments of the present disclosure. For example, method 1600 may be performed by one or more processors, such as image/video decoder 144 (FIG. 1). In some embodiments, image/video decoder 144 may be integrated into apparatus 400 shown in FIG. 4, such that method 1600 can be performed by apparatus 400. Method 1600 can decode a bitstream that utilizes any of the above-mentioned encoding schemes, e.g., the decoding processes illustrated in FIGS. 3A and 3B. As illustrated in FIG. 16, method 1600 includes the following steps.

At step 1610, a processor receives a bitstream comprising compressed image data with regional information. The compressed image data includes coded information representative of one or more regions extracted from a picture. The processes for pre-processing and encoding the extracted regions are described in the embodiments above. The regional information indicates the location(s) of the one or more extracted regions in the picture.

At step 1620, the processor reconstructs the picture by decoding the compressed image data according to the regional information. The processed for decoding a bitstream are described above in connection with FIGS. 3A and 3B, which is incorporated herein. As the region other than the extracted region may be blank and no coding bits are assigned thereto, the processor may skip this region whenever decoding the compressed image to get the picture. In this regard, there is no referencing relationship between the pixels in the extracted region (which is indicated by the regional information) and the region other than the extracted region (which can be extrapolated from the regional information as the picture size is fixed). The decoder may put the emphasis on decoding the compressed image data within the extracted region. Hence, the decoding pressure of the decoder will be decreased compared with decoding a whole picture.

Figure 17:
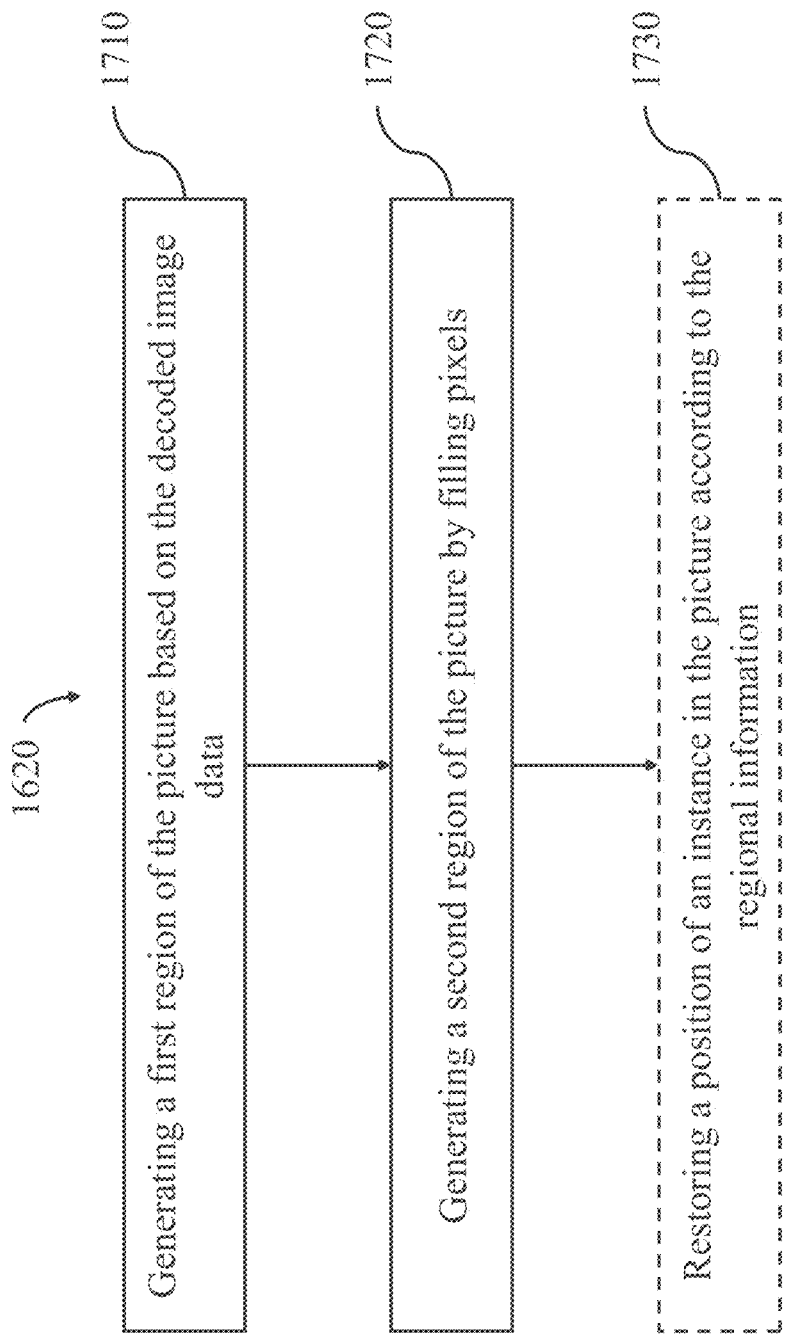
FIG. 17 is a flowchart of an exemplary image data decoding method, according to some embodiments of the present disclosure.

As shown in FIG. 17, step 1620 of reconstructing the picture by decoding the compressed image data according to the regional information can be further disassembled into two steps 1710, 1720 and an optional step 1730.

At step 1710, the processor may generate a first region of the picture based on the decoded image data. The first region is the extracted region where the decoded image data represents. As described above, the decoded pixel values from the decode image data can be used to fill the first region.

At step 1720, the processor may generate a second region of the picture by filling pixels. Here, the second region is at least part of the region other than the first region. As an example, the processor may combine the first region and the second region together to form the whole picture. As another example, the processor may ignore the second region, and thus the second region may be transparent when forming the picture. As another example, the processor may fill the second region with a preset scheme. For example, the processor may fill the second region of picture with "black" or "white" pixels, so the second region may exist as a background of the picture. The black pixels here are pixels with RGB value of (0, 0, 0), while white pixels are with (255, 255, 255). In still another example, the processor may fill the second region with an existing background, e.g., a scenery. For example, the processor may select a scenery picture and then expand or contract it to the size of the picture to be decoded. Next, the processor keys the scenery picture according to the regional information. The remaining portion of the scenery picture after keying can be utilized as a background to form the second region of the picture. Lastly, the processor can merge the first and second regions to form the complete picture.

As an optional step, the processor may restore a position of an instance in the picture according to the regional information at step 1730. In some examples, the decoded picture may be used for other processing, e.g., object identification. The processor may also restore the position of the instance. As a prior assumption, the first region (i.e., the extracted region) may cover one or more instances. By restoring the position of the first region, the position of the instance(s) is known. Hence, emphasis can be put on the restored position in the latter processing, e.g., object identifying.

It should be noted that the regional information described in connection with FIGS. 16 and 17 is not required to decode the compressed video information. Consistent with the disclosed embodiments, any deciding scheme can be used to decode the video information compressed based on the above-described methods. For example, the compressed video information can be decoded by conventional decoders without any special modification.

It is appreciated that an embodiments of the present disclosure can be combined with another embodiments or some other embodiments.

In some embodiments, a non-transitory computer-readable storage medium storing one or more bitstreams processed according to the above-described methods is also provided. For example, the one or more bitstreams may be generated according to methods 700-1200 (FIGS. 7-12). Specifically, according to some embodiments, the one or more bitstreams include syntax segments encoded by an encoder (e.g., image/video encoder 122 in FIG. 1). For example, the one or more bitstreams may be bitstream 228 encoded according to the encoding processes in FIGS. 2A and 2B. Before encoding, the input pictures of the encoder can be pre-analyzed and pre-processed by a preprocessor (e.g., image/video preprocessor 122 in FIG. 1) according to the solutions provided by the present disclosure, e.g., the processes described in connection with FIGS. 7-12. Consistent with the disclosed embodiments, the one or more bitstreams can also be decoded by a decoder (e.g., image/video decoder 144 in FIG. 1). For example, the one or more bitstreams may be bitstream 228 decoded according to the decoding processes in FIGS. 3A and 3B. Moreover, the decoded information can be used to generate reconstructed pictures according to the solutions provided by the present disclosure, e.g., the processes described in connection with FIGS. 16 and 17.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The embodiments may further be described using the following clauses:

1 An image data processing method, comprising:
  receiving a video sequence;
  encoding one or more input pictures associated with the video sequence; and
  generating a bitstream,
  wherein the encoding comprises:
    performing instance segmentation of an input picture, to generate one or more segment masks;
    combining the one or more segment masks to generate a merged mask;
    extracting, from the input picture, a region comprising the merged mask; and
    compressing image data representing the extracted region.

2. The method of clause 1, wherein the extracted region comprises one or more pixels adjacent to the merged mask.

3. The method of clause 1, wherein extracting, from the input picture, the region comprising the merged mask comprises:
   in the input picture, identifying one or more blocks not overlapping with the merged mask; and
   extracting, from the input picture, a region not including the one or more blocks.

4. The method of clause 3, wherein identifying the one or more blocks using a slide window, and a size of the slide window is determined based on at least one of:
   a quantization parameter (QP) for compressing the input picture, or
   a definition of the input picture.

5. The method of clause 1, wherein extracting, from the input picture, the region comprising the merged mask comprises:
   dilating the merged mask to determine a first region extending from a boundary of the merged mask; and
   extracting, from the input picture, the first region and the dilated mask.

6. The method of clause 5, wherein dilating the merged mask by applying a kernel to the merged mask, and a size of the kernel is determined based on at least one of:
   a quantization parameter (QP) for compressing the input picture, or
   a definition of the input picture.

7. The method of clause 1, wherein extracting, from the input picture, the region comprising the merged mask comprises:
   dilating the merged mask to determine a first region extending from a boundary of the merged mask;
   in the input picture, identifying one or more blocks not overlapping with the first region or the merged mask; and
   extracting, from the input picture, a region not including the one or more blocks.

8. The method of clause 1, wherein extracting, from the input picture, the region comprising the merged mask further comprises:
   in the extracted region, determining a second region not overlapping with the merged mask; and
   blurring the second region.

9. The method of clause 1, wherein extracting, from the input picture, the region comprising the merged mask further comprises:
   determining, based on a quantization parameter (QP) for compressing the input picture, whether to blur at least a part of the extracted region; and
   in response to the QP being greater than a predetermined threshold, blurring the part of the extracted region.

10. The method of clause 9, wherein the part of the extracted region does not overlap with the merged mask.

11. A non-transitory computer readable storage medium storing a bitstream generated by a method comprising:
   performing instance segmentation of an input picture, to generate one or more segment masks;
   combining the one or more segment masks to generate a merged mask;
   extracting, from the input picture, a region comprising the merged mask; and
   compressing image data representing the extracted region, to generate the bitstream.

12. The medium of clause 11, wherein the extracted region comprises one or more pixels adjacent to the merged mask.

13. The medium of clause 11, wherein extracting, from the input picture, the region comprising the merged mask comprises:
   in the input picture, identifying one or more blocks not overlapping with the merged mask; and
   extracting, from the input picture, a region not including the one or more blocks.

14. The medium of clause 13, wherein identifying the one or more blocks using a slide window, and a size of the slide window is determined based on at least one of:
   a quantization parameter (QP) for compressing the input picture, or
   a definition of the input picture.

15. The medium of clause 11, wherein extracting, from the input picture, the region comprising the merged mask comprises:
   dilating the merged mask to determine a first region extending from a boundary of the merged mask; and
   extracting, from the input picture, the first region and the merged mask.

16. The medium of clause 15, wherein dilating the merged mask by applying a kernel to the merged mask, and a size of the kernel is determined based on at least one of:
   a quantization parameter (QP) for compressing the input picture, or
   a definition of the input picture.

17. The medium of clause 11, wherein extracting, from the input picture, the region comprising the merged mask comprises:
   dilating the merged mask to determine a first region extending from a boundary of the merged mask;
   in the input picture, identifying one or more blocks not overlapping with the first region or the merged mask; and
   extracting, from the input picture, a region not including the one or more blocks.

18. The medium of clause 11, wherein extracting, from the input picture, the region comprising the merged mask further comprises:
   in the extracted region, determining a second region not overlapping with the merged mask; and
   blurring the second region.

19. The medium of clause 11, wherein extracting, from the input picture, the region comprising the merged mask further comprises:
   determining, based on a quantization parameter (QP) for compressing the input picture, whether to blur at least a part of the extracted region; and
   in response to the QP being greater than a predetermined threshold, blurring the part of the extracted region.

20. The medium of clause 19, wherein the part of the extracted region does not overlap with the merged mask.

21. An image data processing apparatus, comprising:
   a memory storing a set of instructions; and
   one or more processors configured to execute the set of instructions to cause the apparatus to perform operations comprising:
      performing instance segmentation of an input picture, to generate one or more segment masks;
      combining the one or more segment masks to generate a merged mask;
      extracting, from the input picture, a region comprising the merged mask; and
      compressing image data representing the extracted region.

22. The apparatus of clause 21, wherein the extracted region comprises one or more pixels adjacent to the merged mask.

23. The apparatus of clause 21, wherein extracting, from the input picture, the region comprising the merged mask comprises:
  in the input picture, identifying one or more blocks not overlapping with the merged mask; and
  extracting, from the input picture, a region not including the one or more blocks.

24. The apparatus of clause 23, wherein identifying the one or more blocks using a slide window, and a size of the slide window is determined based on at least one of:
  a quantization parameter (QP) for compressing the input picture, or
  a definition of the input picture.

25. The apparatus of clause 21, wherein extracting, from the input picture, the region comprising the merged mask comprises:
  dilating the merged mask to determine a first region extending from a boundary of the merged mask; and
  extracting, from the input picture, the first region and the dilated mask.

26. The apparatus of clause 25, wherein dilating the merged mask by applying a kernel to the merged mask, and a size of the kernel is determined based on at least one of:
  a quantization parameter (QP) for compressing the input picture, or
  a definition of the input picture.

27. The apparatus of clause 21, wherein extracting, from the input picture, the region comprising the merged mask comprises:
  dilating the merged mask to determine a first region extending from a boundary of the merged mask;
  in the input picture, identifying one or more blocks not overlapping with the first region or the merged mask; and
  extracting, from the input picture, a region not including the one or more blocks.

28. The apparatus of clause 21, wherein extracting, from the input picture, the region comprising the merged mask further comprises:
  in the extracted region, determining a second region not overlapping with the merged mask; and
  blurring the second region.

29. The apparatus of clause 21, wherein extracting, from the input picture, the region comprising the merged mask further comprises:
  determining, based on a quantization parameter (QP) for compressing the input picture, whether to blur at least a part of the extracted region; and
  in response to the QP being greater than a predetermined threshold, blurring the part of the extracted region.

30. The apparatus of clause 29, wherein the part of the extracted region does not overlap with the merged mask.

31. A non-transitory computer readable storage medium storing a set of instructions that, when executed by a computer, causes the computer to perform a method comprising:
  performing instance segmentation of an input picture, to generate one or more segment masks;
  combining the one or more segment masks to generate a merged mask;
  extracting, from the input picture, a region comprising the merged mask; and
  compressing image data representing the extracted region, to generate the bitstream.

32. The medium of clause 31, wherein the extracted region comprises one or more pixels adjacent to the merged mask.

33. The medium of clause 31, wherein extracting, from the input picture, the region comprising the merged mask comprises:
  in the input picture, identifying one or more blocks not overlapping with the merged mask; and
  extracting, from the input picture, a region not including the one or more blocks.

34. The medium of clause 33, wherein identifying the one or more blocks using a slide window, and a size of the slide window is determined based on at least one of:
  a quantization parameter (QP) for compressing the input picture, or
  a definition of the input picture.

35. The medium of clause 31, wherein extracting, from the input picture, the region comprising the merged mask comprises:
  dilating the merged mask to determine a first region extending from a boundary of the merged mask; and
  extracting, from the input picture, the first region and the merged mask.

36. The medium of clause 35, wherein dilating the merged mask by applying a kernel to the merged mask, and a size of the kernel is determined based on at least one of:
  a quantization parameter (QP) for compressing the input picture, or
  a definition of the input picture.

37. The medium of clause 31, wherein extracting, from the input picture, the region comprising the merged mask comprises:
  dilating the merged mask to determine a first region extending from a boundary of the merged mask;
  in the input picture, identifying one or more blocks not overlapping with the first region or the merged mask; and
  extracting, from the input picture, a region not including the one or more blocks.

38. The medium of clause 31, wherein extracting, from the input picture, the region comprising the merged mask further comprises:
  in the extracted region, determining a second region not overlapping with the merged mask; and
  blurring the second region.

39. The medium of clause 31, wherein extracting, from the input picture, the region comprising the merged mask further comprises:
  determining, based on a quantization parameter (QP) for compressing the input picture, whether to blur at least a part of the extracted region; and
  in response to the QP being greater than a predetermined threshold, blurring the part of the extracted region.

40. The medium of clause 39, wherein the part of the extracted region does not overlap with the merged mask.

41. An image data processing method, comprising:
  receiving a bitstream; and
  decoding, using coded information of the bitstream, one or more pictures,
  wherein the decoding comprises:
    receiving a bitstream comprising compressed image data with regional information, wherein the regional information indicates the region where the compressed image data represents in a picture; and
    reconstructing the picture by decoding the compressed image data according to the regional information.

42. The method of clause 41, wherein reconstructing the picture by decoding the compressed image data according to the regional information comprises:
generating a first region of the picture based on the decoded image data; and
generating a second region of the picture by filling pixels.

43. The method of clause 41, wherein reconstructing the picture by decoding the compressed image data according to the regional information further comprises:
restoring a position of an instance in the picture according to the regional information.

44. A non-transitory computer readable storage medium storing a bitstream comprising compressed image data with regional information, wherein the regional information indicates the region where the compressed image data represents in a picture, and the bitstream is processed by a method comprising:
reconstructing the picture by decoding the compressed image data according to the regional information.

45. The medium of clause 44, wherein reconstructing the picture by decoding the compressed image data according to the regional information comprises:
generating a first region of the picture based on the decoded image data; and
generating a second region of the picture by filling pixels.

46. The medium of clause 44, wherein reconstructing the picture by decoding the compressed image data according to the regional information further comprises:
restoring a position of an instance in the picture according to the regional information.

47. An image data processing apparatus, comprising:
a memory storing a set of instructions; and
one or more processors configured to execute the set of instructions to cause the apparatus to perform operations comprising:
receiving a bitstream comprising compressed image data with regional information, wherein the regional information indicates the region where the compressed image data represents in a picture; and
reconstructing the picture by decoding the compressed image data according to the regional information.

48. The apparatus of clause 47, wherein reconstructing the picture by decoding the compressed image data according to the regional information comprises:
generating a first region of the picture based on the decoded image data; and
generating a second region of the picture by filling pixels.

49. The apparatus of clause 47, wherein reconstructing the picture by decoding the compressed image data according to the regional information further comprises:
restoring a position of an instance in the picture according to the regional information.

50. A non-transitory computer readable storage medium storing a set of instructions that, when executed by a computer, causes the computer to perform a method comprising:
receiving a bitstream comprising compressed image data with regional information, wherein the regional information indicates the region where the compressed image data represents in a picture; and
reconstructing the picture by decoding the compressed image data according to the regional information.

51. The medium of clause 50, wherein reconstructing the picture by decoding the compressed image data according to the regional information comprises:
generating a first region of the picture based on the decoded image data; and
generating a second region of the picture by filling pixels.

52. The medium of clause 50, wherein reconstructing the picture by decoding the compressed image data according to the regional information further comprises:
restoring a position of an instance in the picture according to the regional information.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. An image data processing method, comprising:
receiving a video sequence;
encoding one or more input pictures associated with the video sequence; and
generating a bitstream,
wherein the encoding comprises:
performing instance segmentation of an input picture, to generate one or more segment masks;
combining the one or more segment masks to generate a merged mask;
extracting, from the input picture, a region comprising the merged mask; and
compressing image data representing the extracted region, wherein the extracted region comprises one or more pixels adjacent to the merged mask.

2. The method of claim 1, wherein extracting, from the input picture, the region comprising the merged mask comprises:
in the input picture, identifying one or more blocks not overlapping with the merged mask; and
extracting, from the input picture, a region not including the one or more blocks.

3. The method of claim 2, wherein identifying the one or more blocks using a slide window, and a size of the slide window is determined based on at least one of:
a quantization parameter (QP) for compressing the input picture, or
a definition of the input picture.

4. The method of claim 1, wherein extracting, from the input picture, the region comprising the merged mask comprises:
dilating the merged mask to determine a first region extending from a boundary of the merged mask; and
extracting, from the input picture, the first region and the dilated mask.

5. The method of claim 4, wherein dilating the merged mask by applying a kernel to the merged mask, and a size of the kernel is determined based on at least one of:
a quantization parameter (QP) for compressing the input picture, or
a definition of the input picture.

6. The method of claim 1, wherein extracting, from the input picture, the region comprising the merged mask comprises:
dilating the merged mask to determine a first region extending from a boundary of the merged mask;
in the input picture, identifying one or more blocks not overlapping with the first region or the merged mask; and
extracting, from the input picture, a region not including the one or more blocks.

7. The method of claim 1, wherein extracting, from the input picture, the region comprising the merged mask further comprises:
in the extracted region, determining a second region not overlapping with the merged mask; and
blurring the second region.

8. The method of claim 1, wherein extracting, from the input picture, the region comprising the merged mask further comprises:
determining, based on a quantization parameter (QP) for compressing the input picture, whether to blur at least a part of the extracted region; and
in response to the QP being greater than a predetermined threshold, blurring the part of the extracted region.

9. The method of claim 8, wherein the part of the extracted region does not overlap with the merged mask.

10. The method of claim 1, wherein the instance segmentation is performed by a convolutional neural network (CNN).

11. A non-transitory computer readable storage medium storing a bitstream generated by receiving a video sequence, encoding the video sequence to generate coded information included in the bitstream, and transmit the bitstream, wherein the encoding comprises:
performing instance segmentation of an input picture, to generate one or more segment masks;
combining the one or more segment masks to generate a merged mask;
extracting, from the input picture, a region comprising the merged mask; and
compressing image data representing the extracted region, to generate the bitstream, wherein the extracted region comprises one or more pixels adjacent to the merged mask.

12. The medium of claim 11, wherein extracting, from the input picture, the region comprising the merged mask comprises:
in the input picture, identifying one or more blocks not overlapping with the merged mask; and
extracting, from the input picture, a region not including the one or more blocks.

13. The medium of claim 12, wherein identifying the one or more blocks using a slide window, and a size of the slide window is determined based on at least one of:
a quantization parameter (QP) for compressing the input picture, or
a definition of the input picture.

14. The medium of claim 11, wherein extracting, from the input picture, the region comprising the merged mask comprises:
dilating the merged mask to determine a first region extending from a boundary of the merged mask; and
extracting, from the input picture, the first region and the merged mask.

15. The medium of claim 14, wherein dilating the merged mask by applying a kernel to the merged mask, and a size of the kernel is determined based on at least one of:
a quantization parameter (QP) for compressing the input picture, or
a definition of the input picture.

16. The medium of claim 11, wherein extracting, from the input picture, the region comprising the merged mask comprises:
dilating the merged mask to determine a first region extending from a boundary of the merged mask;
in the input picture, identifying one or more blocks not overlapping with the first region or the merged mask; and
extracting, from the input picture, a region not including the one or more blocks.

17. The medium of claim 11, wherein extracting, from the input picture, the region comprising the merged mask further comprises:
in the extracted region, determining a second region not overlapping with the merged mask; and
blurring the second region.

18. An image data processing apparatus, comprising:
a memory storing a set of instructions; and
one or more processors configured to execute the set of instructions to cause the apparatus to perform operations comprising:

performing instance segmentation of an input picture, to generate one or more segment masks;

combining the one or more segment masks to generate a merged mask;

extracting, from the input picture, a region comprising the merged mask; and compressing image data representing the extracted region, wherein the extracted region comprises one or more pixels adjacent to the merged mask.

* * * * *